(12) United States Patent  
Momoi

(10) Patent No.: US 7,027,261 B2  
(45) Date of Patent: Apr. 11, 2006

(54) DISK APPARATUS HAVING AN IMPROVED CLAMP STRUCTURE

(75) Inventor: Yoshimitsu Momoi, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/472,417

(22) PCT Filed: May 17, 2002

(86) PCT No.: PCT/JP02/04769

§ 371 (c)(1),
(2), (4) Date: Sep. 18, 2003

(87) PCT Pub. No.: WO02/095746

PCT Pub. Date: Nov. 28, 2002

(65) Prior Publication Data

US 2005/0099723 A1    May 12, 2005

(30) Foreign Application Priority Data

May 18, 2001    (JP)    ............................ 2001-148803

(51) Int. Cl.
*G11B 17/02*    (2006.01)

(52) U.S. Cl. .................. 360/98.08; 360/99.12
(58) Field of Classification Search ............. 360/98.08, 360/99.12

See application file for complete search history.

(56) References Cited

U.S. PATENT DOCUMENTS

| | | | | |
|---|---|---|---|---|
| 4,918,545 A | * | 4/1990 | Scheffel | .................... 360/98.08 |
| 5,422,768 A | * | 6/1995 | Roehling et al. | ......... 360/98.08 |
| 5,517,374 A | * | 5/1996 | Katakura et al. | ......... 360/98.07 |
| 5,724,209 A | * | 3/1998 | Dunckley et al. | ........ 360/98.08 |
| 5,731,928 A | | 3/1998 | Jabbari et al. | |
| 6,417,988 B1 | * | 7/2002 | Renken et al. | ........... 360/99.12 |

FOREIGN PATENT DOCUMENTS

| | | |
|---|---|---|
| JP | 63-161468 U | 10/1988 |
| JP | 4-90046 U | 8/1992 |
| JP | 5-8757 U | 2/1993 |
| JP | 9-106622 A | 4/1997 |
| JP | 2002-157816 A | 5/2001 |

OTHER PUBLICATIONS

International Search Report Dated Aug. 7, 2002 (4 pages).

* cited by examiner

*Primary Examiner*—A. J. Heinz
(74) *Attorney, Agent, or Firm*—RatnerPrestia

(57) ABSTRACT

A magnetic disk apparatus can achieve reduced thickness by reducing thickness of the clamp, improved shock resistance achieved by an increase of clamping force, and reduced rotating synchronous deviation due to such as camber or undulation of a disk generated by eccentricity of the disk depressing section, a disk receiving surface of the spindle hub and the disk. That is, on a circumference more inwards than a portion in contact with an outside diameter of screw head section and clamp, clamp has displacement section in a screw axial direction throughout the whole circumference with a contact section set as a reference.

6 Claims, 19 Drawing Sheets

US 7,027,261 B2

DISK APPARATUS HAVING AN IMPROVED CLAMP STRUCTURE

This application is a U.S. National Phase of International Application No. PCT/JP02/04769 filed May 17, 2002, which claims priority to Japanese Application No. 2001-148803 filed May 18, 2001.

BACKGROUND OF THE INVENTION

1. Field of the Invention

The present invention relates to a structure of magnetic disk apparatus. More specifically, the present invention relates to a structure of a thin type clamp for fixing magnetic disks to spindle hubs.

2. Description of the Background Art

FIG. 15 is a perspective view showing an appearance of a magnetic disk apparatus. To spindle hub 2 rotated by spindle motor 5, one or a plurality of disk 1 are laminated and fixed at even intervals and on both surfaces or one surface of disk 1, head 21 is rotatably arranged. This head 21 is fixed to the head end section of actuator 22, and to the other end of actuator 22, voice coil motor 24 is installed. As spindle motor 2 rotates, head 21 slightly floats up from disk 1 by air stream generated between the surface of disk 1 and head 21.

On the other hand, head 21 turns around actuator shaft 23 by a driving force of voice coil motor 24, travels on disk 1 in an radial direction, and reads and writes data. Because the float-up amount of head 21 is about few score nanometers, and entry of dust and grime between head 21 and disk 1 gives damage to head 21 and disk 1 and causes troubles, magnetic disk apparatus is assembled in a clean room, and after the assembly, it is hermetically sealed with cover 25. In order to correctly read and write the data, head 21 must accurately follow a data track formed helically on disk 1, and there are severe restrictions in the radial direction and an axial direction with respect to rotating deviation of disk 1. Main rotating deviation of disk 1 includes:

(1) rotating synchronous/asynchronous deviation arising from bearing of spindle motor 5 and its mounting;

(2) rotating synchronous deviation arising from processing errors of spindle hub 2;

(3) rotating synchronous deviation of disk 1 arising from clamping force when clamp 3 is tightened;

(4) rotating synchronous deviation caused by deviating the data track center and rotating center axis;

(5) rotating asynchronous deviation of spindle motor 5 and disk 1 arising from mechanical resonance; and others.

Because in recent years, the density of magnetic disk increases and a large volume of information has become possible to be recorded on a disk of low recording area, development has been positively taking place for adopting magnetic disk apparatus as recording medium of, for example, mobile equipment. The conditions required for recording medium of mobile equipment include not only small and compact size but also low power consumption and shock resistance from the viewpoint of their characteristics of use.

FIG. 16 shows a cross-sectional view before clamped showing the first clamp structure in a conventional magnetic disk apparatus. Clamp 3 grasps disk 1 between disk depressing section 3g and disk receiving surface 2e by axial force of screw 4. Disk 1 is integrally fixed to spindle hub 2 by frictional force of relevant contact sections. In the event that large shock that exceeds this frictional force is applied, the position of disk 1 fixed to clamp 3 and spindle hub 2 may be greatly deviated. This is called as disk shift and one of the causes to give raise to the rotating deviation of disk 1. When disk shift occurs, large eccentricity is generated in the data track originally provided coaxially with the rotating center axis and it becomes difficult for head 21 to accurately follow the data track.

When a hard disk is used for a recording medium of mobile equipment, shockproof to guarantee normal operation even after shocks exceeding 1500 G are applied at the time of non-operation is frequently required. The following configuration is known for improving the shock resistance. That is, because the frictional force which fixes disk 1 must be increased to prevent disk shift arising from strong shock, methods of increasing the frictional coefficient or of increasing axial force are assumed. Conventionally, a method of increasing axial force has been adopted. This is because the surface roughness must be refined for spindle hub 2 and clamp 3 as their processing accuracy would be required, or burr and adhesion of contaminant, etc. are feared. Furthermore, because the float-up amount of head 21 with respect to disk 1 is few score nanometers and technologies tend to lower the float-up amount, the finer, the more desirable is the surface roughness. Consequently, it was unable to coarsen surface roughness (increase the frictional coefficient) of spindle hub 2, and clamp 3, or disk 1 bottom surface. From a technological point of view, a method of coarsening the surface roughness in the clamping area only excluding the data area is possible, but this would inevitably result in cost increase. Consequently, as a conclusion, a method of increasing axial force has been adopted.

However, as shown in Paragraph (3) above, increasing axial force to improve shock resistance increases rotating synchronous deviation of disk 1 caused by the clamping force when clamp 3 is tightened. This means that conditions for improving shock resistance and conditions for solving rotating synchronous deviation of disk 1 arising from clamping force would conflict each other. Consequently, it is essential to reconcile improvement of shock resistance and elimination of rotating synchronous deviation particularly in developing small-size magnetic disk apparatus.

In order to suppress rotating synchronous deviation of disk 1 arising from increased clamping force to the minimum, it is necessary to hold the center axis of disk depressed section coaxial with the disk receiving surface of spindle hub and disk center axis. Referring now to two kinds of clamp structure in conventional magnetic disk apparatus, these relations are explained.

FIGS. 16 and 17 show the first clamp structure in conventional magnetic disk apparatus. Referring to FIG. 16, disk 1 is inserted in disk inserting boss 2a of spindle hub 2. One of the bottom surfaces of disk 1 is received by disk receiving surface 2e. Clamp 3 is mounted on the other bottom surface of disk 1 coaxially with disk 1, and tightened between screw 4 and female thread 2c provided at boss 2a of spindle hub 2. Since the diameter of thread head section 4b of screw 4 is greater than the diameter of central hole 3a of clamp 3, axial force is generated when screw 4 is tightened to female thread 2c of spindle hub 2. The axial force is transmitted to bottom surface 3f in the vicinity of clamp central hole 3a from thread head section bearing surface 4c, presses the other bottom surface of disk 1 at disk depressing section 3g, and allows clamp 3 to coaxially and integrally fix disk 1 to spindle hub 2.

In order to coaxially mount disk 1 to spindle hub 2, the central hole of disk 1 and peripheral cylindrical section of disk insertion boss 2d of spindle hub 2 slightly smaller than the central hole diameter of disk 1 are positioned and fitted to each other. In addition, in order to coaxially mount clamp 3 and spindle hub 2, clamp positioning boss 2a of spindle hub 2 and clamp central hole 3a with a diameter slightly greater than the diameter of clamp positioning boss 2a are positioned and fitted to each other. Positioning is achieved by arranging clamp positioning boss 2a and clamp 3 in such a manner to have a catching portion of length a (see enlarged view of FIG. 16). The catching portion is provided to prevent clamp 3 from deviating in the direction perpendicular to the center axis. Clamp 3 bends by thickness b with length the catching portion excluded, and is tightened by screw 4.

Note that, boss 2a of spindle hub 2, disk insertion boss 2d, and disk receiving surface 2e hold coaxial with the rotating center axis, respectively. On the other hand, disk depressing section 3g of clamp 3 and clamp central hole 3a also hold coaxial with the rotating center axis. That is, disk depressing section 3g holds coaxial with disk receiving surface 2e of spindle hub 3 and disk 1. FIG. 17 shows a cross-sectional view after clamped in the conventional magnetic disk apparatus. FIG. 17 shows how the above-mentioned component elements hold coaxial with the rotating center axis.

Referring now to FIG. 18, description will be made on the necessity why disk depressing section 3g is held coaxial with disk receiving surface 2e of spindle hub 3 and disk 1. FIG. 18 is a cross-sectional view showing magnetic disk apparatus with deflection of disk generated due to the clamp structure with coaxiality not maintained. From the figure, it is understood that spindle hub center axis 2h and clamp center axis 3q are deviated. This is because unbalance of load working point to the load back face is generated due to non-uniform load distribution to disk depressing section 3g by the axial force from screw head bearing surface 4c transmitted eccentrically to clamp central hole 3a and disk depressing section 3g being eccentric to disk 1 and disk receiving surface 2e, and disk 1 causes large camber in the axial force direction on the eccentric direction side of clamp 3, while on the opposite side of the eccentric direction large camber is generated in the direction opposite to the axial force. If spindle motor 5 rotates under this condition, rotating synchronous deviation results. Consequently, it is necessary to hold disk depressing section 3g concentric with disk receiving surface 2e of spindle hub 3 and disk 1.

FIGS. 19A and 19B show the second clamp structure in conventional magnetic disk apparatus. FIG. 19A is a cross-sectional view before clamped showing the second clamp structure in conventional magnetic disk apparatus. FIG. 19B is a cross-sectional view after clamped, showing the second clamp structure in conventional magnetic disk apparatus. Since the configuration of disk 1, spindle hub 2, clamp 3, screw 4, and female screw 2c are the same as those in the first clamp structure (FIG. 16, 17), the description will be omitted.

Now, in order to make disk 1 concentric with spindle hub 2, the central hole of disk 1 and peripheral cylindrical section of disk insertion boss 2d of spindle hub 2 slightly smaller than central hole diameter of disk 1 must be positioned and fitted in. Consequently, in the second clamp structure, two or more non-through holes 2f are provided at equal angle intervals on spindle hub 2 and at the same time on a coaxial pitch circle with the rotating center axis of spindle hub 2. Non-through holes 2f of spindle hub 2 and hole 3o of clamp 3 are arranged in such a manner that the relevant centers are overlapped, jig pin 20 is inserted into the overlapped portion, and non-through hole 2f, hole 3o, and jig pin 20 are fitted in. That is, non-through holes 2f, hole 3o, and jig pin 20 are means for positioning clamp 3 with respect to spindle hub 2.

Note that, non-through holes 2f formed at 2 or more places at equal angle intervals of spindle hub 2, disk inserting boss 2d, and disk receiving surface 2e are kept coaxial with the rotating center axis, respectively. On the other hand, disk depressing section 3g of clamp 3 and clamp central hole 3a are kept coaxial. That is, disk depressing section 3g is kept coaxial with disk receiving surface 2e of spindle hub 3 and disk 1.

Next, discussion will be made on reasons why conventional second clamp structure (FIG. 19) is chosen. FIG. 20 shows a cross-sectional view of screw with screw driving hole and screw head reinforced. In the event that disk apparatus is made still thinner, thickness of screw head section 4b must be made still thinner, and screw head reinforcement 4d must be provided for forming screw driving hole 4e. In the case of the first clamp structure (FIG. 16, FIG. 17), clamp positioning boss 2a has been provided to spindle hub 2. Because as screw head section reinforcement 4d increases, the diameter of boss 2a must be increased to prevent interference between inner circumferential hole provided and screw head reinforcement 4, diameters of clamp central hole 3a and screw head 4d must also be increased. However, the diameter of screw head section 4d becomes more and more difficult to fabricate because of restrictions of thread head section forming.

When the second clamp structure (FIG. 19) and first clamp structure (FIG. 16, FIG. 17) are compared, the diameter of screw head section 4d can be reduced in the second clamp structure (FIG. 19) as much as clamp positioning boss 2a which is no longer required. That is, in the event that a still thinner type is pursued, the second clamp structure (FIG. 19) is advantageous. The clamp thickness can be reduced to the degree in which characteristics as a spring will not be lost, that is, to the degree in that no plastic deformation occurs when clamping force is applied.

As described above, the clamp structure in magnetic disk apparatus must satisfy conflicting requirements of reducing thickness, securing freedom of disk shift against guaranteed vibration and shock values, and reducing camber, undulation, etc. of disk 1 generated by eccentricity between disk depressing section and disk receiving surface of spindle hub and disk.

Now, description will be made on problems which the first clamp structure (FIG. 16, FIG. 17) and the second clamp structure (FIG. 19) have in conventional magnetic disk apparatus.

First of all, problems of the first clamp structure (FIG. 16, FIG. 17) are described as follows. In general, clamp disk 9 is manufactured of aluminum or stainless steel. For a processing method, cutting using press, lathes, etc. is adopted, and in any case, it is possible to produce a large quantity in a short time, and it is a processing method with primary emphasis placed on cost. For clamp 3 in the first clamp structure shown in FIG. 16 and FIG. 17, the method of fabricating using press would be best-suited for mass production. From the clamp structure, the following relation must be found:

$$\text{(Thickness } t \text{ of clamp 3)} = x + y \quad \text{(Eq. I)},$$

where x is the catching portion of clamp central hole 3a and clamp positioning boss 2a and y is a deflection amount of clamp 3. Furthermore, for clamping force N of clamp 3, the following relation must be found:

$$\text{Clamping force } N = K^* y \quad \text{(Eq. II),}$$

where K is an axial spring constant of clamp 3.

As described above, since clamp 3 as one of components, is required to reduce its size and thickness, in particular, for small-size magnetic disk apparatus, t must be reduced from Eq. I. The catching portion x greater than a specified amount is definitely needed for positioning clamp 3. Consequently, deflection amount y must be reduced. However, if deflection amount y is reduced, axial force is reduced.

However, large axial force, that is, large clamping force is also required for a small-size magnetic disk apparatus. That is, according to Eq. II, N must be kept large. K is a constant that is defined by material, shape, and thickness. It is difficult to increase thickness from the viewpoint of a requirement of reducing thickness. Consequently, the deflection rate y must be increased.

The foregoing description indicates that the conditions required for deflection amount y contradict each other in Eq. I and Eq. II. Under the current requirement for clamp, it is difficult to achieve reduced size and thickness of clamp 3 and increase clamping force simultaneously.

Next description will be made on problems in the second clamp structure (FIG. 19) as follows. The eccentricity between disk depressing section 3g of clamp 3 and disk receiving surface 2e is qualitatively compared with the first clamp structure (FIG. 16). The smaller the eccentricity, the smaller are camber and undulation of disk 1.

In the first clamp structure (FIG. 16, FIG. 17), eccentricity between disk depressing section 3g (FIG. 16) of clamp 3 and disk receiving surface 2e (FIG. 16) is caused by the following size and accumulation of tolerances. That is, (1) A clearance between clamp positioning boss 2a (FIG. 16) and clamp central hole 3a (FIG. 16), (2) Eccentricity between clamp positioning boss 2a and disk receiving surface 2e, and (3) Eccentricity between clamp central hole 3a and disk depressing section 3g.

On the other hand, in the second clamp structure (FIG. 19), eccentricity of disk depressing section 3g of clamp 3 (FIG. 19) and disk receiving surface 2e (FIG. 19) is generated at least following size and accumulation of tolerances.

(1) Eccentricity of pitch circle center and disk depressing section 3g of clamp hole 3o (FIG. 19).

(2) Variations of pitch circle diameter of clamp hole 3o.

(3) Variations of diameter of clamp hole 3o.

(4) Eccentricity of pitch circle center of non-through hole 2f (FIG. 19) and disk receiving surface 2e.

(5) Variations of pitch circle diameter of non-through hole 2f.

(6) Variations of a diameter of non-through hole 2f.

As described above, in the second clamp structure (FIG. 19), eccentricity of disk depressing section 3g of clamp 3 and disc receiving surface 2e increases and camber and undulation of disk 1 increase. To prevent this, in fabricating parts, severe processing accuracy is required, and this results in cost increase.

Furthermore, in inserting jig pin 20 (FIG. 19), in order to improve the positioning accuracy of clamp 3, play generated between parts must be suppressed to the minimum, and degraded operability and trouble in assembly will result. Specifically, displacement of clamp 3 (FIG. 19) generated when screw 4 (FIG. 19) is tightened to spindle hub 2 (FIG. 19) is generated not only in the axial direction but also in the radial direction. Consequently, there are cases in which jig pin 20 is grasped between side surface of hole 3o of clamp 3 and side surface of non-through hole 2f of spindle hub 2, and is difficult to be removed. As the axial displacement of clamp 3 increases, radial displacement increases. That is, the greater is the axial force, the more degraded is the operability in assembly and the more increased are troubles.

SUMMARY OF THE INVENTION

It is an object of the present invention to provide a disk apparatus which can be manufactured to be compact and thin, and additionally has a clamp structure with large clamping force.

A disk apparatus according to the present invention includes: a disk which stores information; a clamp which has a central hole; a spindle hub which is equipped with the disk, has a boss that fits into the clamp and allows a rotating center axis of the spindle hub to coincide with a center axis of the clamp; a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and a spindle motor which rotates the spindle hub. A profile of the clamp on a circumference more inwards than a contact section between the clamp and the head section, is displaced to a direction of the axial force with the contact section set as a reference. According to the clamp structure in a magnetic disk apparatus of the present invention, thickness of the apparatus can be reduced by reducing thickness of the clamp. Further, the apparatus can achieve improved shock resistance achieved by an increase of clamping force, and reduced rotating synchronous deviation due to such as tilt or undulation of a disk generated by eccentricity of the disk depressing section, a disk receiving surface of the spindle hub and the disk.

The clamp may be displaced in a direction opposite to the direction of the axial force with the contact section set as a reference in a still inner circumference.

A disk apparatus of the present invention includes: a disk which stores information; a clamp which has a central hole; a spindle hub which is equipped with the disk, has a boss that fits into the clamp and allows a rotating center shaft of the spindle hub to coincide with a center shaft of the clamp; a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and a spindle motor which rotates the spindle hub. The head section comes in contact with the clamp in an innermost circumferential section of the clamp, and a profile of the clamp on the circumference more outwards than a contact section between the head section and the innermost circumferential section is displaced to a direction of the axial force with the contact section set as a reference. With this configuration, the above object is achieved.

A disk apparatus of the present invention includes: a disk which stores information; a clamp which has a central hole; a spindle hub which is equipped with the disk, has a boss that fits into the clamp and allows a rotating center shaft of the spindle hub to coincide with a center shaft of the clamp; a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and a spindle motor which rotates the spindle hub. The clamp on a circumference more inwards than a contact section between the clamp and the head section, and has a plurality of protrusions in a direction of the axial force with the contact section set as a reference. With this configuration, the above object is achieved.

The spindle hub may fit in an inner circumferential side surface of the plurality of protrusions of the clamp and allows a rotating center axis of the spindle hub to coincide with a center axis of the clamp.

A disk apparatus of the present invention includes: a disk which stores information; a clamp which has a central hole; a spindle hub which is equipped with the disk, has a boss that fits into the clamp and allows a rotating center axis of the spindle hub to coincide with a center axis of the clamp; a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and a spindle motor which rotates the spindle hub. The clamp on a circumference more inwards than a contact section between the clamp and the head section, has a plurality of protrusions in a direction opposite to a direction of the axial force with the contact section set as a reference. With this configuration, the above object is achieved.

The spindle hub may be equipped with a boss which fits in an inner circumferential side surface where no plurality of protrusions of clamp exist and allows the rotating center axis of the spindle hub to coincide with the center axis of the clamp.

A disk apparatus of the present invention includes: a disk which stores information; a clamp which has a central hole; a spindle hub which is equipped with the disk; a screw which has a thread section and a head section, said thread section passing the central hole of the clamp and being tightened to the spindle hub; a ring-form washer which is provided between the head section and the clamp, and a spindle motor which rotates the spindle hub. The head section provides the clamp, via the washer, with an axial force generated when the thread section is tightened to the spindle hub, to fix the disk to the spindle hub. With this configuration, the above object is achieved.

The washer may be joined to the clamp in such a manner that a center axis of the washer coincides with a center axis of the central hole.

The washer may be formed with resin and may be integrally formed with the clamp so that the center axis coincides with the center axis of the clamp central hole.

A diameter of the central hole of the clamp may be smaller than a diameter of a hole of the washer.

A disk apparatus of the present invention includes: a disk which stores information; a clamp which has a central hole; a spindle hub which is equipped with the disk; a screw which has a thread section and a head section, said thread section passing the central hole of the clamp and being tightened to the spindle hub, and said head section coming in contact with a first surface of the clamp and providing the clamp with an axial force generated when the thread section is tightened to the spindle hub, to fix the disk to the spindle hub; a ring-form washer which is provided to come in contact with a second surface of the clamp other than the first surface; and a spindle motor which rotates the spindle hub. The second surface of the clamp and the washer are joined together, and the spindle hub is further equipped with a boss which fits in an inner circumferential side surface of the clamp and allows a rotating center axis of the spindle hub to coincide with a center axis of the clamp. With this configuration, the above object is achieved.

The washer may be joined to the clamp in such a manner that a center axis coincides with a center axis of the clamp central hole.

The washer may be formed with resin and is integrally formed with the clamp so that a center axis coincides with a center axis of the central hole.

A diameter of a hole of the washer is equal to or smaller than a diameter of the central hole of the clamp.

A disk apparatus of the present invention includes: a disk which stores information; a spindle hub which is equipped with the disk; a clamp with a central hole which fixes the disk to the spindle hub; a screw which has a thread section and a head section, said thread section passing the central hole of the clamp and being tightened to the spindle hub, and said head section coming in contact with a first surface of the clamp and providing the clamp with an axial force generated when the thread section is tightened to the spindle hub, to fix the disk to the spindle hub; and a spindle motor which rotates the spindle hub. The clamp has a deep drawn cylindrical section which is smaller than a diameter of a disk depressing section and which is larger than a diameter of the central hole, and the spindle hub is further equipped with a boss which fits in an inner circumferential side surface of the clamp and allows a rotating center axis of the spindle hub to coincide with a center axis of the clamp. With this configuration, the above object is achieved.

A disk apparatus of the present invention includes: a disk which stores information; a clamp which has a central hole and has a plurality of holes located at predetermined intervals on a circle coaxial with a center axis of the disk; a spindle hub which is equipped with the disk and is equipped with a plurality of bosses corresponding to the plurality of the holes of the clamp; a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and a spindle motor which rotates the spindle hub. Each of head ends of the plurality of bosses is smaller than each of the plurality of holes of the clamp, and the plurality of bosses are inserted into the plurality of holes to determine a position of the clamp. With this configuration, the above object is achieved.

The plurality of bosses may be formed by fixing pins.

One of the pins may have a step on a first edge and has an elastic material on a second edge to be inserted in the spindle hub.

A disk apparatus of the present invention includes: a spindle hub with a clamp disk assembly which equips a disk to store information, clamp and shims, and a spindle motor which rotates the spindle hub. The clamp of the clamp disk assembly has: an inner circumferential cylindrical section; an outer circumferential cylindrical section smaller than a diameter of a central hole of the disk; and a flange section larger than a diameter of the central hole of the disk, on one edge. The shims of the clamp disk assembly are provided in a substantially ring form having a central hole and an outer circumference smaller than an outer circumference of the disk. The disk and the shims of the clamp disk assembly are inserted in the outer circumferential cylindrical section of the clamp, and both surfaces of the disk are fixed by grasping between the flange section of the clamp and the shims. With this configuration, the above object is achieved.

A disk apparatus of the present invention includes: a spindle hub with a clamp disk assembly which equips a disk to store information, clamp and shims, and a spindle motor which rotates the spindle hub. The clamp of the clamp disk assembly has: an inner circumferential cylindrical section; an outer circumferential cylindrical section smaller than a diameter of a central hole of the disk; and a dish-form flange section larger than a diameter of the central hole of the disk, on one edge. The shims of the clamp disk assembly are provided in a substantially ring form having a central hole and an outer circumference smaller than an outer circumference of the disk. The disk and the shims of the clamp disk assembly are inserted in the outer circumferential cylindrical section of the clamp, and an inner circumferential chamfered section provided on one surface of the disk is grasped by the dish-form flange section of the clamp to be fixed, and the other surface of the disk is grasped by the shims to be fixed. With this configuration, the above object is achieved.

The clamp and the shims may be fixed by pressure-fitting a side surface of the outer circumferential cylindrical section of the clamp and an inner circumferential side surface of the shims.

The clamp and the shims may be fixed by shrinkage-fitting a side surface of the outer circumferential cylindrical section of the clamp and an inner circumferential side surface of the shims.

The clamp and the shims may be fixed by tightening a male thread located on a side surface of the outer circumferential cylindrical section of the clamp to a female thread located on an inner circumferential side surface of the shims.

The clamp disk assembly and the spindle hub may be fixed by tightening a female thread located on a side surface of the inner circumferential cylindrical section of the clamp to a male thread located at an outer circumferential section of the spindle hub.

Two or more slits may be formed in the flange section.

The clamp disk assembly and the spindle hub may be fixed by affixing the inner circumferential cylindrical section of the clamp to an outer circumferential section of the spindle hub.

The clamp disk assembly and the spindle hub may be fixed by pressure-fitting the inner circumferential cylindrical section of the clamp to an outer circumferential section of the spindle hub.

BRIEF DESCRIPTION OF THE DRAWINGS

This and other objects and features of the present invention will become clear from the subsequent description of a preferred embodiment thereof made with reference to the accompanying drawings, in which like parts are designated by like reference numerals and in which.

DETAILED DESCRIPTION OF THE PREFERRED EMBODIMENTS

Figure 15:
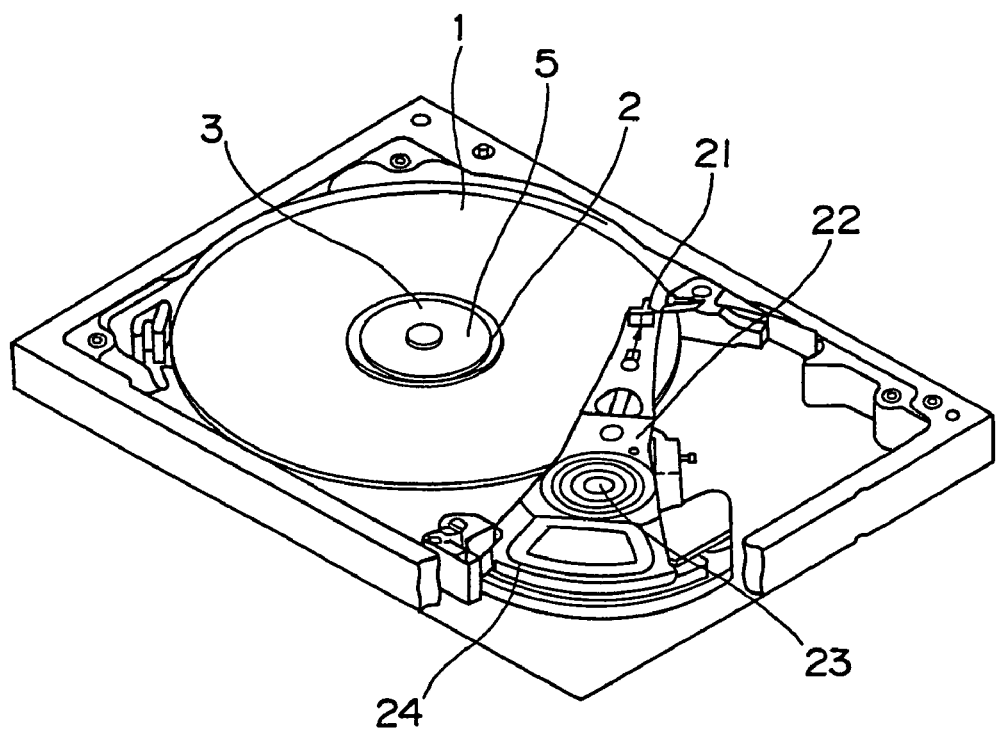
FIG. 15 is a perspective view showing the appearance of a magnetic disk apparatus.

Referring now to the attached drawings, preferred embodiments of the present invention will be described as follows. In the figure, chain double-dashed lines indicate cover 25 of a magnetic disk apparatus. In the present specification, a magnetic disk apparatus is, for example, a hard disk drive as shown in FIG. 15.

EMBODIMENT 1

Figure 1A:
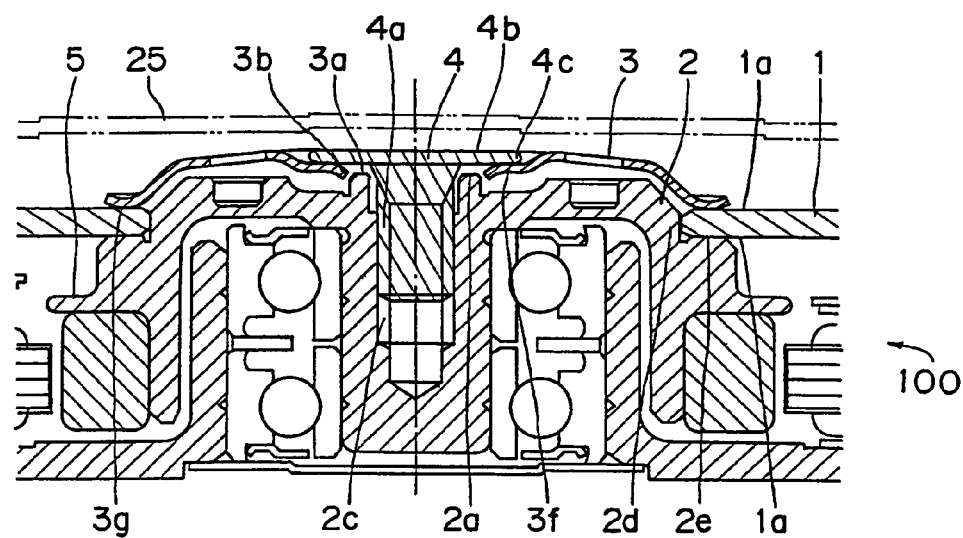
FIG. 1A is a cross-sectional view of magnetic disk apparatus according to embodiment 1 before clamped.
Figure 1B:
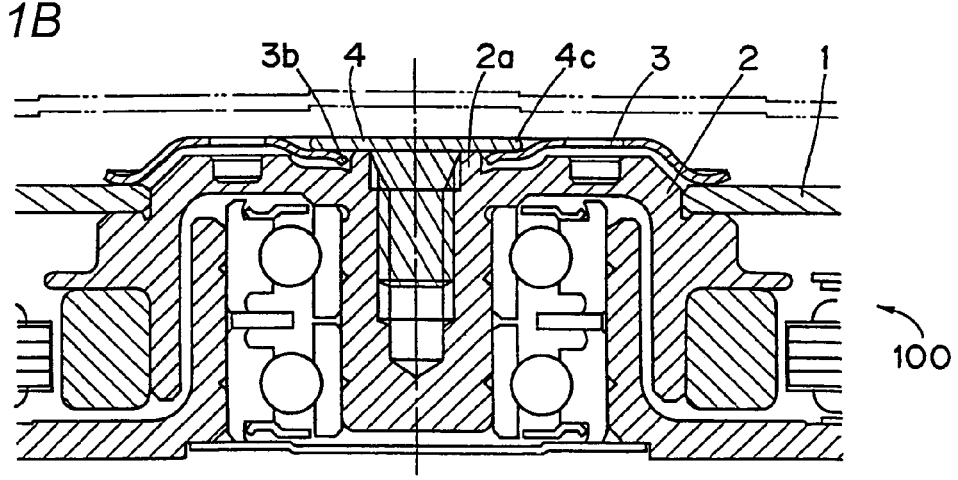
FIG. 1B is a cross-sectional view of magnetic disk apparatus according to embodiment 1 after clamped.

FIGS. 1A and 1B show cross-sectional views of a clamp structure in magnetic disk apparatus 100 of embodiment 1. FIG. 1A shows a cross-sectional view of magnetic disk apparatus 100 before clamped. FIG. 1B shows a cross-sectional view of magnetic disk apparatus 100 after clamped.

Referring to FIG. 1A, magnetic disk apparatus 100 includes disk 1 which stores information, spindle hub 2 equipped with disk 1, clamp 3 which fixes disk 1 integrally to spindle hub 2, one piece of screw 4 which tightens clamp 3 to spindle hub 2, and spindle motor 5 which rotates spindle hub 2. The central hole of disk 1 is inserted over disk inserting boss 2d of spindle hub 2 and one bottom surface of disk 1 is received by receiving surface 2e. Clamp 3 is placed on the other bottom of disk 1 coaxially with disk 1, and screw 4 is tightened to female screw 2c provided on boss 2a of spindle hub 2 via clamp central hole 3a. In the present specification, the term "coaxial" means that center axes coincide each other. The diameter of screw head section 4b of screw 4 is larger than the diameter of central hole 3a of clamp 3. The axial force generated when screw 4 is tightened to female screw 2c of spindle hub 2 is transmitted from screw head section bearing surface 4c to bottom surface 3f in the vicinity of clamp central hole 3a, and presses the other bottom surface of disk 1 at disk depressing section 3g. As a result, clamp 3 fixes disk 1 to spindle hub 2 coaxially and integrally.

Figure 16:
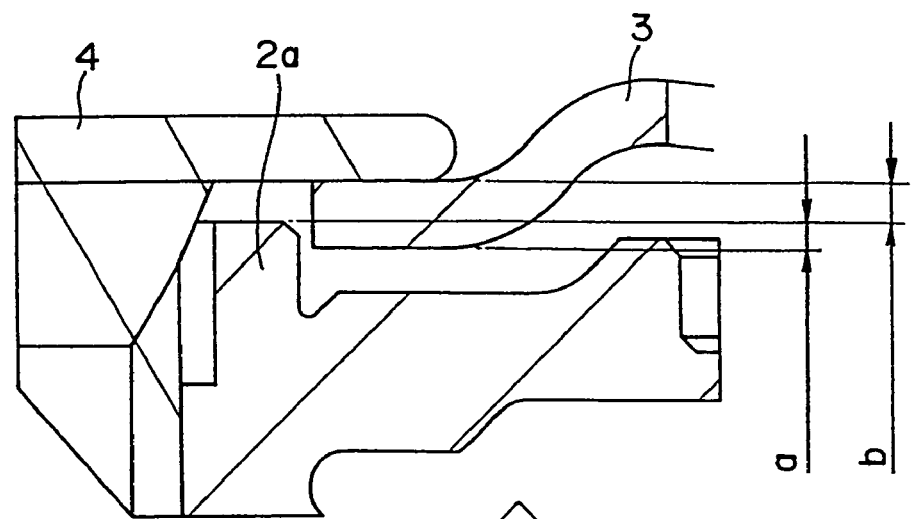
FIG. 16 is a cross-sectional view showing the first clamp structure in a conventional magnetic disk apparatus.
Figure 16:
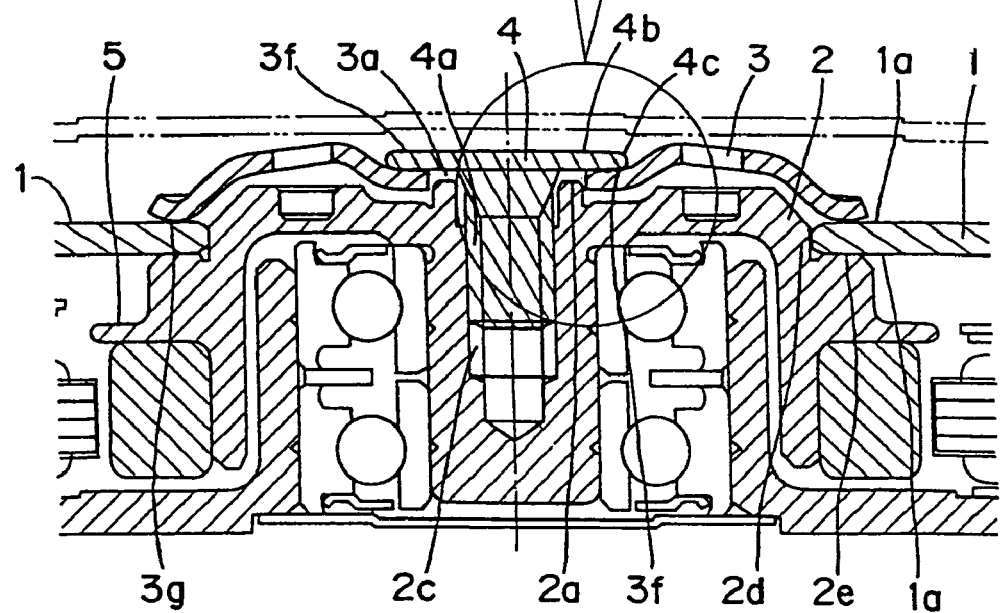
Figure 17:
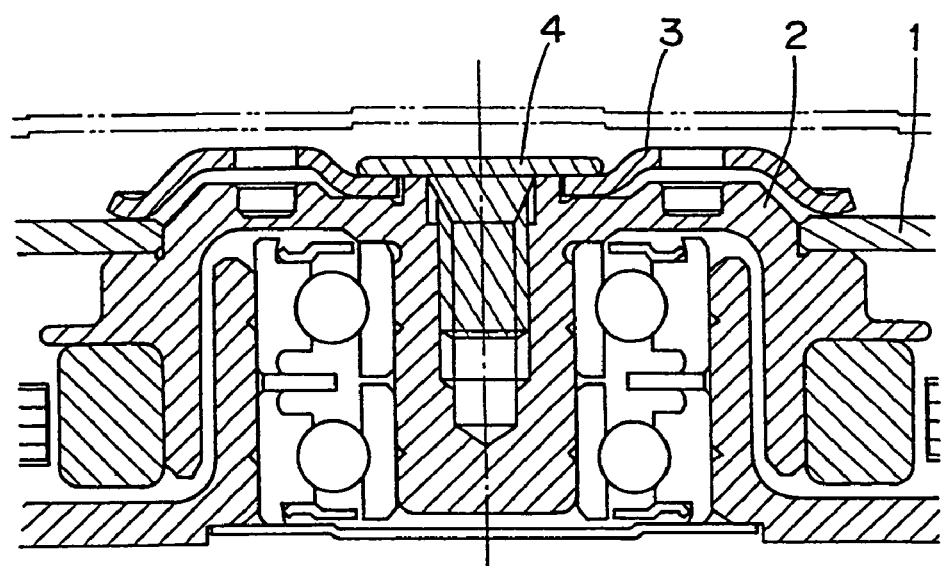
FIG. 17 is a cross-sectional view in conventional magnetic disk apparatus after clamped.
Figure 18:
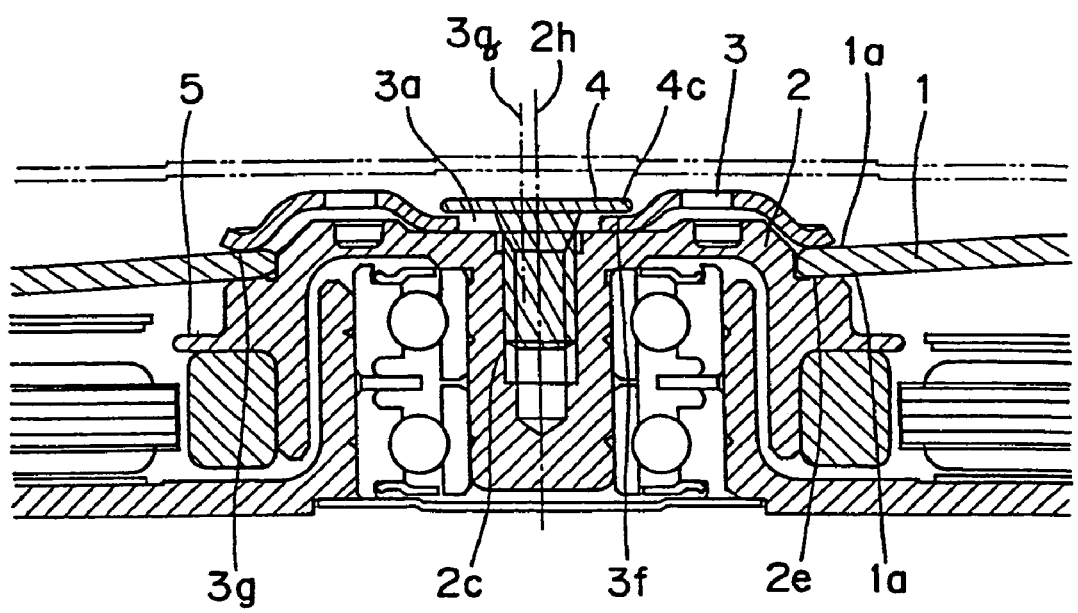
FIG. 18 is a cross-sectional view showing camber of a disk of a clamp structure with no coaxiality achieved in conventional magnetic disk apparatus.

In order to coaxially mount disk 1 and spindle hub 2, the central hole of disk 1 and outer-circumferential cylindrical section of disk insertion boss 2d of spindle hub 2 slightly smaller than the central hole diameter of disk 1 are positioned and fitted in. In addition, in order to coaxially mount clamp 3 and spindle hub 2, clamp positioning boss 2a of spindle hub 2 and clamp central hole 3a having a diameter slightly larger than the diameter of this clamp positioning boss 2a are positioned and fitted in. That is, clamp positioning boss 2a of spindle hub 2 functions as a section to position a surface plane of the clamp. So far, the description is the same as that for the first clamp structure in conventional magnetic disk apparatus (FIG. 16 and FIG. 17).

The feature of embodiment 1 lies in a structure in which clamp 3 is coaxially equipped to spindle hub 2. Now, the detail is explained as follows. Screw 4 comes in contact with the vicinity of central hole 3a of clamp 3 in the vicinity of outside diameter of screw head section 4b. The structural features of embodiment 1 is that the profile of clamp 3 on the circumference more inwards than the contact section is displaced to a direction of screw axial force throughout the whole circumference with the contact section as a reference. The displaced section is indicated as displacement section 3b. The plane position of clamp 3 is determined by fitting displacement section 3b in the screw axial force direction to clamp positioning boss 2a of spindle hub 2. That is, by displacement section 3b in the screw axial force direction, thickness of fitting section, that is, catching portion ("a" of enlarged view of FIG. 16) with clamp positioning boss 2a of spindle hub 2 can be secured. Consequently, movement in a direction perpendicular to the screw axial force direction is restricted and the plane position of clamp 3 can be determined. Furthermore, because by securing the catching portion by displacement section 3b, it is possible to assign greater part of thickness of clamp 3 to deflection rate of clamp 3 ("b" of enlarged view of FIG. 16), the axial force can be increased. Displacement section 3b in the screw axial force direction throughout the whole circumference of clamp disk 3 stipulated in FIG. 1 may have the whole section curvilinearly tilted or rectilinearly tilted, or have a stepped configuration with the innermost circumferential section set horizontal.

Same as the first clamp structure (FIG. 16 and FIG. 17) in the conventional magnetic disk apparatus, boss 2a, disk insertion boss 2d, and disk receiving surface 2e of spindle hub 2 are all kept coaxial with the rotating center axis. On the other hand, disk depressing section 3g and clamp central hole 3a of clamp 3 are kept coaxial. That is, disk depressing section 3g is held coaxial with respect to disk receiving surface 2e of spindle hub 3 and disk 1.

Referring to FIG. 1B showing a cross-sectional view after clamped, screw 4 is tightened until screw head section bearing surface 4c comes in contact with clamp positioning boss 2a of spindle hub 2. The axial displacement rate of clamp 3 can be secured as much as the displacement rate of displacement section 3b in the screw axial force direction, as compared to the first clamp structure (FIG. 16 and FIG. 17) in the conventional magnetic disk apparatus. Consequently, even when thinner clamp 3 is used, by securing a larger displacement rate of displacement section 3b in the screw axial force direction, it is possible to obtain great axial force. Note that, since the size of displacement section 3b can be optionally varied, it is possible to freely adjust the ratio of displacement rate (deflection) and catching portion to the thickness of clamp 3. By securing greater displacement rate, the axial force can be improved. According to the invention of embodiment 1, conflicting requirements of reduced thickness of magnetic disk apparatus by reducing thickness of a clamp, improved shock resistance by increase of clamping force, and reduced rotating synchronous deviation such as camber, undulation, etc. of the disk due to eccentricity between disk depressing section, disk receiving surface of the spindle hub and the disk can be simultaneously satisfied.

EMBODIMENT 2

Figure 2A:
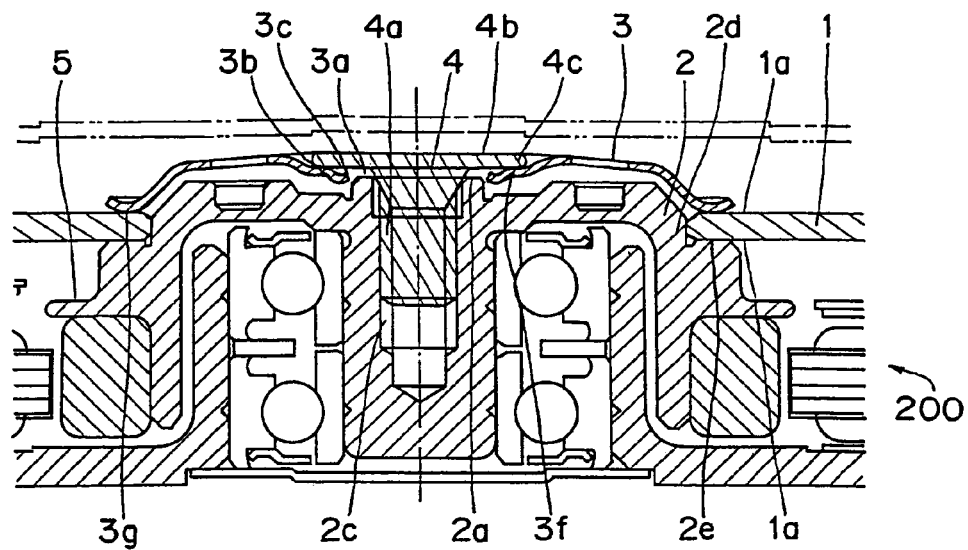
FIG. 2A is a cross-sectional view of magnetic disk apparatus according to embodiment 2 before clamped.
Figure 2B:
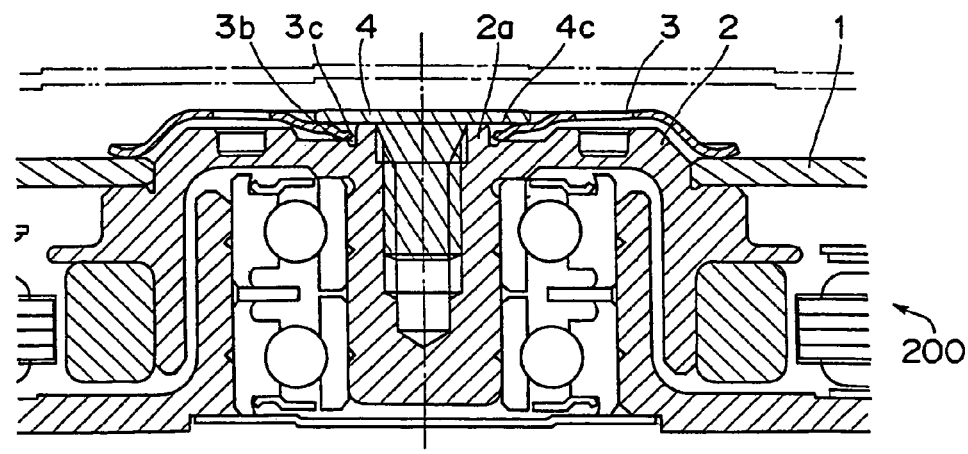
FIG. 2B is a cross-sectional view of magnetic disk apparatus according to embodiment 2 after clamped.

FIGS. 2A and 2B are cross-sectional views of clamp structure in magnetic disk apparatus 200 of embodiment 2. FIG. 2A shows a cross-sectional view of magnetic disk apparatus 200 before clamped. FIG. 2B shows a cross-sectional view of magnetic disk apparatus 200 after clamped.

Referring now to FIG. 2A; magnetic disk apparatus 200 includes disk 1 for recording information, spindle hub 2 equipped with disk 1, clamp 3 for fixing disk 1 integrally to spindle hub 2, one piece of screw 4 for tightening clamp 3 to spindle hub 2, and spindle motor 5 for rotating spindle hub 2. The central hole of disk 1 is inserted over disk inserting boss 2d of spindle hub 2 and one bottom surface of disk 1 is received by disk receiving surface 2e. Clamp 3 is placed on the other bottom of disk 1 coaxially with disk 1, and screw 4 is tightened to female screw 2c provided on boss 2a of spindle hub 2 via clamp central hole 3a. The diameter of screw head section 4b of screw 4 is larger than the diameter of central hole 3a of clamp 3. The axial force generated when screw 4 is tightened to female screw 2c of spindle hub 2 is transmitted from screw head section bearing surface 4c to bottom surface 3f in the vicinity of clamp central hole 3a, and presses the other bottom surface of disk 1 at disk depressing section 3g. As a result, clamp 3 fixes disk 1 to spindle hub 2 coaxially and integrally.

In order to coaxially mount disk 1 and spindle hub 2, the central hole of disk 1 and outer-circumferential cylindrical section of disk insertion boss 2d of spindle hub 2 slightly smaller than the central hole diameter of disk 1 are positioned and fitted in. In addition, in order to coaxially mount clamp 3 and spindle hub 2, clamp positioning boss 2a of spindle hub 2 and clamp central hole 3a having a diameter slightly larger than the diameter of this clamp positioning boss 2a are positioned and fitted in. That is, clamp positioning boss 2a of spindle hub 2 functions as a clamp plane positioning section. So far, the description is the same as that for the clamp structure in magnetic disk apparatus 100 of embodiment 1 (FIG. 1).

The feature of embodiment 2 lies in the structure in which clamp 3 is coaxially equipped to spindle hub 2. Now, the detail is explained as follows. Screw 4 comes in contact with the vicinity of central hole 3a of clamp 3 in the vicinity of outside diameter of screw head section 4b. The structural features of embodiment 2 is that the profile of clamp 3 on the circumference more inwards than the contact section simultaneously possesses displacement section 3b in the screw axial force direction throughout the whole circumference with the contact section set as a reference and displacement section 3c in the direction opposite to the screw axial force direction which reduces this displacement rate. Because the displacement section 3b in the screw axial force direction is the same as that of embodiment 1, the description will be omitted. On the other hand, by displacement section 3c in the direction opposite to the screw axial force direction, it is possible to reduce the displacement rate of clamp 3 in the screw axial force direction. By the fitting between this displacement section 3b and displacement section 3c and clamp positioning boss 2a of spindle hub 2, the plane position of clamp 3 is determined. Since displacement section 3c in the direction opposite to the screw axial force direction is provided, fitting of clamp 3 when it is fitted to clamp positioning boss 2a becomes easy, and it becomes possible to position clamp 3 at the time of manufacturing much more easily than when displacement section 3b in the screw axial force direction is simply provided.

Furthermore, the gradient of displacement section 3c in the direction opposite to the screw axial force direction and clamp positioning boss 2a enables clamp positioning boss 2a of spindle hub 2 to be automatically inserted into clamp central hole 3a by the dead weight of clamp 3 by only placing clamp 3 on the bottom surface of disk 1. Note that, displacement section 3b in the screw axial force direction throughout the whole circumference of clamp disk 3 stipulated in FIG. 2A may have the whole section curvilinearly tilted or rectilinearly tilted, or have a stepped configuration with the innermost circumferential section set horizontal.

Same as the clamp structure of embodiment 1 shown in FIG. 1, boss 2a, disk insertion boss 2d, and disk receiving surface 2e of spindle hub 2 are all kept coaxial with the rotating center axis. On the other hand, disk depressing section 3g and clamp central hole 3a of clamp 3 are kept coaxial. That is, disk depressing section 3g is held coaxial with respect to disk receiving surface 2e of spindle hub 3 and disk 1.

Referring to FIG. 2B showing a cross-sectional view after clamped, screw 4 is tightened until screw head section bearing surface 4c comes in contact with clamp positioning boss 2a of spindle hub 2. By providing displacement section 3b in the screw axial force direction, advantages same as those in embodiment 1 can be obtained. Furthermore, since displacement section 3c in the direction opposite to the screw axial force direction is provided, fitting of clamp 3 when it is fitted to clamp positioning boss 2a becomes easy, and it becomes possible to position clamp 3 at the time of manufacturing much more easily than when displacement section 3b in the screw axial force direction is simply provided. With the foregoing description, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 3

Figure 3A:
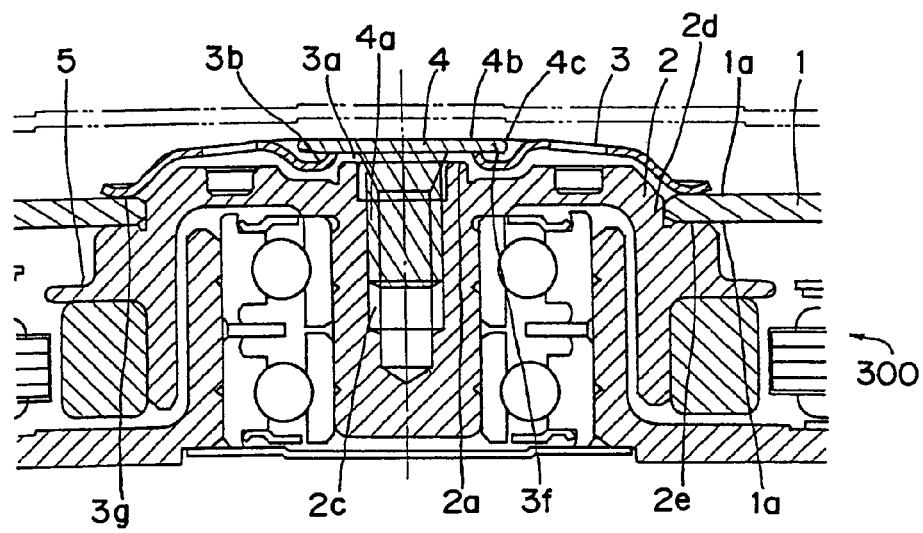
FIG. 3A is a cross-sectional view of magnetic disk apparatus according to embodiment 3 before clamped.
Figure 3B:
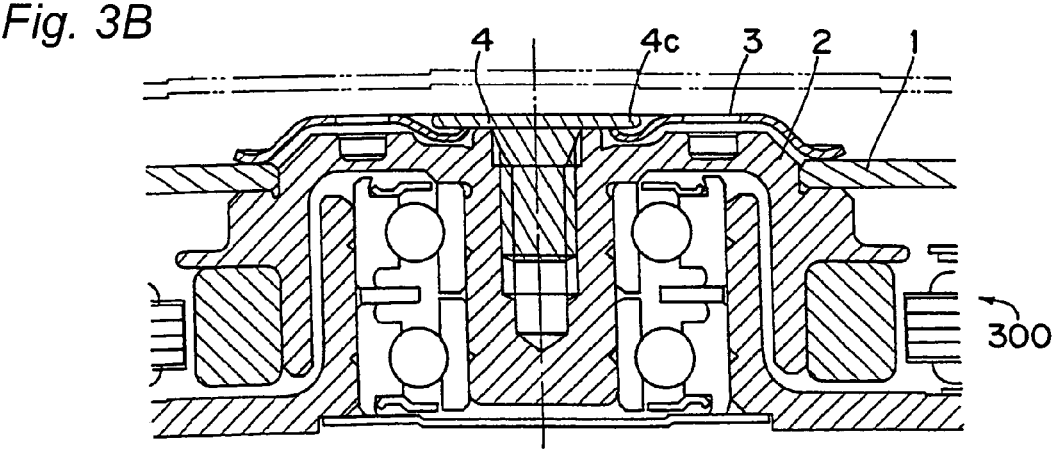
FIG. 3B is a cross-sectional view of magnetic disk apparatus according to embodiment 3 after clamped.

FIGS. 3A and 3B are cross-sectional views of clamp structure in magnetic disk apparatus 300 of embodiment 3. FIG. 3A shows a cross-sectional view of magnetic disk apparatus 300 before clamped. FIG. 3B shows a cross-sectional view of magnetic disk apparatus 300 after clamped.

Referring now to FIG. 3A, magnetic disk apparatus 300 includes disk 1 for recording information, spindle hub 2 equipped with disk 1, clamp 3 for fixing disk 1 integrally to spindle hub 2, one piece of screw 4 for tightening clamp 3 to spindle hub 2, and spindle motor 5 for rotating spindle hub 2. The central hole of disk 1 is inserted over disk inserting boss 2d of spindle hub 2 and one bottom surface of disk 1 is received by receiving surface 2e. Clamp 3 is placed on the other bottom of disk 1 coaxially with disk 1, and screw 4 is tightened to female screw 2c provided on boss 2a of spindle hub 2 via the clamp central hole 3a. The diameter of screw head section 4b of screw 4 is larger than the diameter of central hole 3a of clamp 3. The axial force generated when screw 4 is tightened to female screw 2c of spindle hub 2 is transmitted from screw head section bearing surface 4c to bottom surface 3f in the vicinity of clamp central hole 3a, and presses the other bottom surface of disk 1 at disk depressing section 3g. As a result, clamp 3 fixes disk 1 to spindle hub 2 coaxially and integrally.

In order to coaxially mount disk 1 and spindle hub 2, the central hole of disk 1 and outer circumferential cylindrical section of disk insertion boss 2d of spindle hub 2 slightly smaller than the central hole diameter of disk 1 are positioned and fitted in. In addition, in order to coaxially mount clamp 3 and spindle hub 2, clamp positioning boss 2a of spindle hub 2 and clamp central hole 3a having a diameter slightly larger than the diameter of this clamp positioning boss 2a are positioned and fitted in. That is, clamp positioning boss 2a of spindle hub 2 functions as a clamp plane positioning section. So far, the description is the same as that for the clamp structure in magnetic disk apparatus 200 of embodiment 2 (FIGS. 2A and 2B).

The feature of embodiment 3 lies in the structure in which clamp 3 is coaxially equipped to spindle hub 2. Now, the detail is explained as follows. Screw 4 comes in contact with central hole 3a of clamp 3 in the vicinity of inner circumference of screw head section 4b. The structural features of embodiment 3 is that the profile of clamp 3 on the circumference more outwards than the contact section is displaced in the screw axial force direction throughout the whole circumference with the contact section set as a reference. The displaced portion is shown as displacement section 3b. By the fitting between this displacement section 3b and clamp positioning boss 2a of spindle hub 2, the plane position of clamp 3 is determined.

Furthermore, the gradient of displacement section 3b in the screw axial force direction and clamp positioning boss 2a enables clamp positioning boss 2a of spindle hub 2 to be automatically inserted into clamp central hole 3a by the dead weight of clamp 3 by only placing clamp 3 on the bottom surface of disk 1. Note that, displacement section 3b in the screw axial force direction throughout the whole circumference of clamp disk 3 stipulated in FIG. 3A may have the whole section curvilinearly tilted or rectilinearly tilted, or have a stepped configuration with the innermost circumferential section set horizontal.

Same as the clamp structure of embodiment 2 shown in FIGS. 2A and 2B, boss 2a, disk insertion boss 2d, and disk receiving surface 2e of spindle hub 2 are all kept coaxial with the rotating center axis. On the other hand, disk depressing section 3g and clamp central hole 3a of clamp 3 are kept coaxial. That is, disk depressing section 3g is held coaxial with respect to disk receiving surface 2e of spindle hub 3 and disk 1.

Referring to FIG. 3B showing a cross-sectional view after clamped, screw 4 is tightened until screw head section bearing surface 4c comes in contact with clamp positioning boss 2a of spindle hub 2. The axial displacement rate of clamp 3 in such event is able to be secured as much as the displacement rate of displacement section 3b in the screw axial force direction, as compared to the first clamp structure (FIG. 16 and FIG. 17) in the conventional magnetic disk apparatus. Consequently, even when thinner clamp 3 is used, by securing a larger displacement rate of displacement section 3b in the screw axial force direction, it is possible to obtain great axial force. With the foregoing description, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 4

Figure 4A:
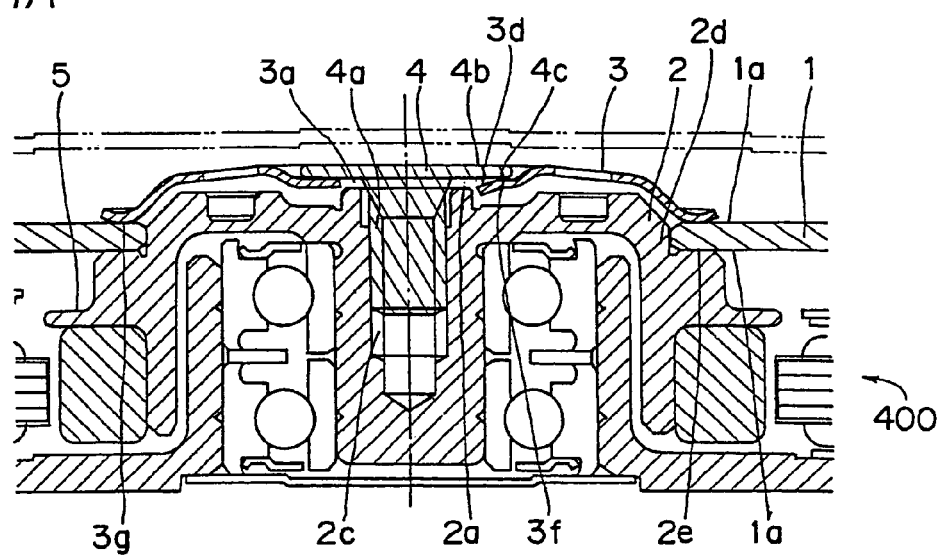
FIG. 4A is a cross-sectional view of magnetic disk apparatus according to embodiment 4 before clamped.
Figure 4B:
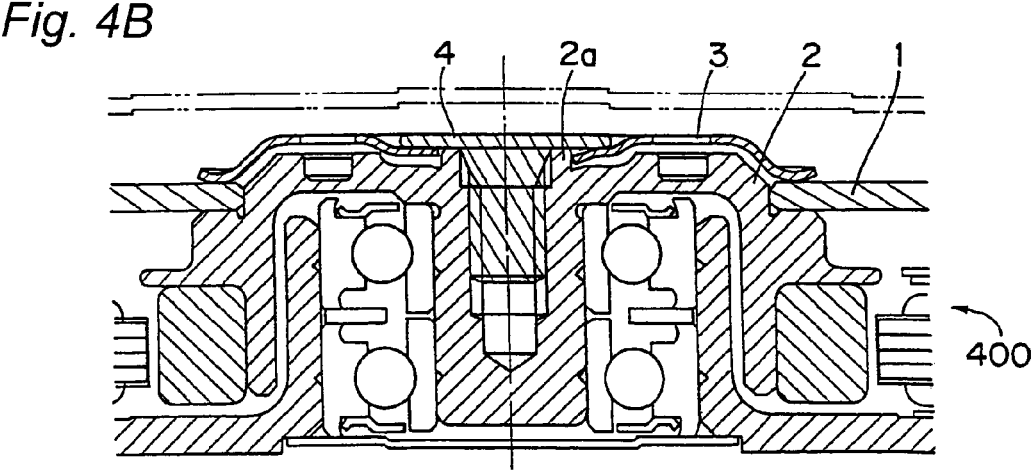
FIG. 4B is a cross-sectional view of magnetic disk apparatus according to embodiment 4 after clamped.
Figure 5:
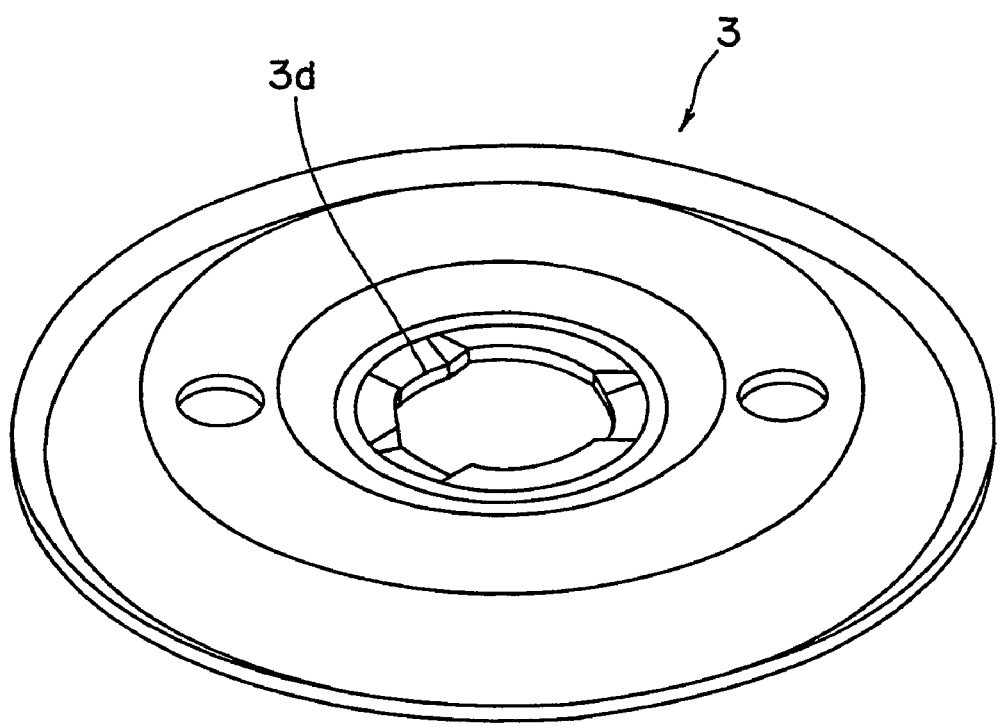
FIG. 5 is a perspective view of a clamp related to embodiment 4.

FIGS. 4A and 4B are cross-sectional views of clamp structure in magnetic disk apparatus 400 of embodiment 4. FIG. 4A shows a cross-sectional view of magnetic disk apparatus 400 before clamped. FIG. 4B shows a cross-sectional view of magnetic disk apparatus 400 after clamped. In addition, FIG. 5 is a perspective view of clamp 3 related to embodiment 4.

Referring now to FIG. 4A, magnetic disk apparatus 400 includes disk 1 for recording information, spindle hub 2 equipped with disk 1, clamp 3 for fixing disk 1 integrally to spindle hub 2, one piece of screw 4 for tightening clamp 3 to spindle hub 2, and spindle motor 5 for rotating spindle hub 2. The central hole of disk 1 is inserted over disk inserting boss 2d of spindle hub 2 and one bottom surface of disk 1 is received by disk receiving surface 2e. Clamp 3 is placed on the other bottom of disk 1 coaxially with disk 1, and screw 4 is tightened to female screw 2c provided on boss 2a of spindle hub 2 via the clamp central hole 3a. The diameter of screw head section 4b of screw 4 is larger than the diameter of central hole 3a of clamp 3. The axial force generated when screw 4 is tightened to female screw 2c of spindle hub 2 is transmitted from screw head section bearing surface 4c to bottom surface 3f in the vicinity of clamp central hole 3a, and presses the other bottom surface of disk 1 at disk depressing section 3g. As a result, clamp 3 fixes disk 1 to spindle hub 2 coaxially and integrally.

In order to coaxially mount disk 1 and spindle hub 2, the central hole of disk 1 and outer circumferential cylindrical section of disk insertion boss 2d of spindle hub 2 slightly smaller than the central hole diameter of disk 1 are positioned and fitted in. In addition, in order to coaxially mount clamp 3 and spindle hub 2, clamp positioning boss 2a of spindle hub 2 and clamp central hole 3a having a diameter slightly larger than the diameter of this clamp positioning boss 2a are positioned and fitted in. That is, clamp positioning boss 2a of spindle hub 2 functions as a clamp plane positioning section. So far, the description is the same as that for the clamp structure in magnetic disk apparatus 300 of embodiment 3 (FIGS. 3A and 3B).

The feature of embodiment 4 lies in the structure in which clamp 3 is coaxially equipped to spindle hub 2. Now, the detail is explained as follows. Screw 4 comes in contact with the circumferential section of central hole 3a of clamp 3 at screw head section 4b. The structural features of embodiment 4 is, as shown in FIG. 5, that the profile of clamp 3 on the circumference more inwards than the contact section has two or more protrusions 3d in the screw axial force direction with the contact section set as a reference. By the fitting between this protrusion 3d and clamp positioning boss 2a of spindle hub 2, the plane position of clamp 3 is determined.

Same as the clamp structure of embodiment 3 shown in FIGS. 3A and 3B, boss 2a, disk insertion boss 2d, and disk receiving surface 2e of spindle hub 2 are all kept coaxial with the rotating center axis. On the other hand, disk depressing section 3g and clamp central hole 3a of clamp 3 are kept coaxial. That is, disk depressing section 3g is held coaxial with respect to disk receiving surface 2e of spindle hub 3 and disk 1.

Referring to FIG. 4B showing a cross-sectional view after clamped, screw 4 is tightened until screw head section bearing surface 4c comes in contact with clamp positioning boss 2a of spindle hub 2. The axial displacement rate of clamp 3 in such event is able to be secured as much as the displacement rate of displacement section 3b in the screw axial force direction, as compared to the first clamp structure (FIG. 16 and FIG. 17) in the conventional magnetic disk apparatus. Consequently, even when thinner clamp 3 is used, by securing a larger displacement rate of displacement section 3b in the screw axial force direction, it is possible to obtain great axial force. With the foregoing description, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 5

Figure 6A:
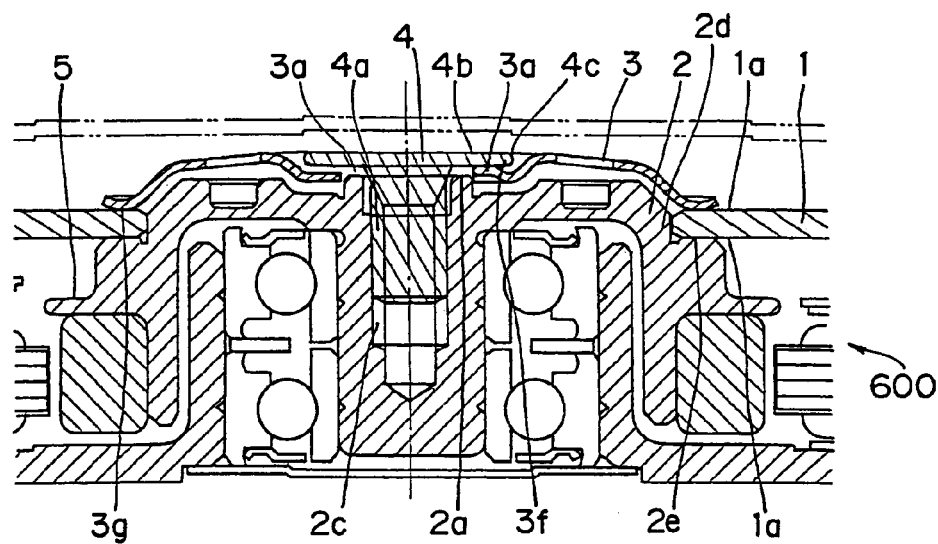
FIG. 6A is a cross-sectional view of magnetic disk apparatus according to embodiment 5 before clamped.
Figure 6B:
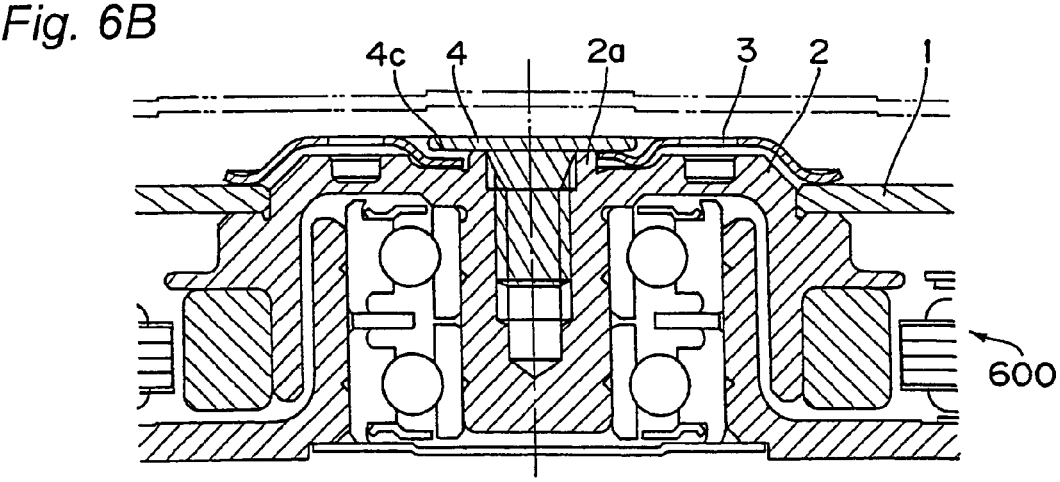
FIG. 6B is a cross-sectional view of magnetic disk apparatus according to embodiment 5 after clamped.
Figure 7:
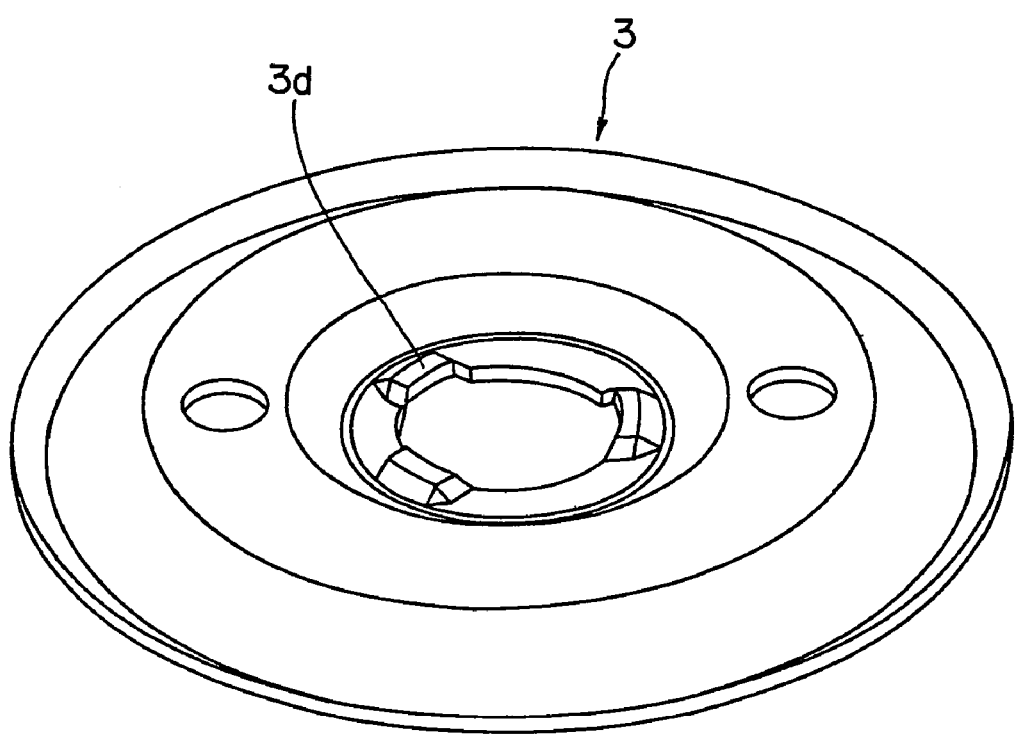
FIG. 7 is a perspective view of a clamp related to embodiment 5.

FIGS. 6A and 6B are cross-sectional views of clamp structure in magnetic disk apparatus 600 of embodiment 5. FIG. 6A shows a cross-sectional view of magnetic disk apparatus 600 before clamped. FIG. 6B shows a cross-sectional view of magnetic disk apparatus 600 after clamped. In addition, FIG. 7 is a perspective view of clamp 3 related to embodiment 5.

Referring now to FIG. 6A, magnetic disk apparatus 600 includes disk 1 for recording information, spindle hub 2 equipped with disk 1, clamp 3 for fixing disk 1 integrally to spindle hub 2, one piece of screw 4 for tightening clamp 3 to spindle hub 2, and spindle motor 5 for rotating spindle hub 2. The central hole of disk 1 is inserted over disk inserting boss 2d of spindle hub 2 and one bottom surface of disk 1 is received by receiving surface 2e. Clamp 3 is placed on the other bottom of disk 1 coaxially with disk 1, and screw 4 is tightened to female screw 2c provided on boss 2a of spindle hub 2 via the clamp central hole 3a. The diameter of screw head section 4b of screw 4 is larger than the diameter of central hole 3a of clamp 3. The axial force generated when screw 4 is tightened to female screw 2c of spindle hub 2 is transmitted from screw head section bearing surface 4c to bottom surface 3f in the vicinity of clamp central hole 3a, and presses the other bottom surface of disk 1 at disk depressing section 3g. As a result, clamp 3 fixes disk 1 to spindle hub 2 coaxially and integrally.

In order to coaxially mount disk 1 and spindle hub 2, the central hole of disk 1 and outer circumferential cylindrical section of disk insertion boss 2d of spindle hub 2 slightly smaller than the central hole diameter of disk 1 are positioned and fitted in. In addition, in order to coaxially mount clamp 3 and spindle hub 2, clamp positioning boss 2a of spindle hub 2 and clamp central hole 3a having a diameter slightly larger than the diameter of this clamp positioning boss 2a are positioned and fitted in. That is, clamp positioning boss 2a of spindle hub 2 functions as a clamp plane positioning section. So far, the description is the same as that for the clamp structure in magnetic disk apparatus 400 of embodiment 4 (FIGS. 4A and 4B).

The feature of embodiment 5 lies in the structure in which clamp 3 is coaxially equipped to spindle hub 2. Now, the detail is explained as follows. Screw 4 comes in contact with the circumferential section of clamp central hole 3a at screw head section 4b. The structural features of embodiment 5 is, as shown in FIG. 7, that the profile of clamp 3 on the circumference more inwards than the contact section has two or more protrusions 3d in the direction opposite to the screw axial force direction with the contact section set as a reference. The practical contact section between screw head section 4b and the circumferential section of clamp central hole 3a is this protrusion 3d. By the fitting between this protrusion 3d and clamp positioning boss 2a of spindle hub 2, the plane position of clamp 3 is determined.

Same as the clamp structure of embodiment 4 shown in FIGS. 4A and 4B, boss 2a, disk insertion boss 2d, and disk receiving surface 2e of spindle hub 2 are all kept coaxial with the rotating center axis. On the other hand, disk depressing section 3g and clamp central hole 3a of clamp 3 are kept coaxial. That is, disk depressing section 3g is held coaxial with respect to disk receiving surface 2e of spindle hub 3 and disk 1.

Referring to FIG. 6B showing a cross-sectional view after clamped, screw 4 is tightened until screw head section bearing surface 4c comes in contact with clamp positioning boss 2a of spindle hub 2. The axial displacement rate of clamp 3 in such an event is able to be secured as much as the displacement rate of displacement section 3b in the screw axial force direction, as compared to the first clamp structure (FIG. 16 and FIG. 17) in the conventional magnetic disk apparatus. Consequently, even when thinner clamp 3 is used, by securing a larger displacement rate of two or more protrusions 3d in the direction opposite to the screw axial force direction, it is possible to obtain great axial force. With the foregoing description, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 6

Figure 8A:
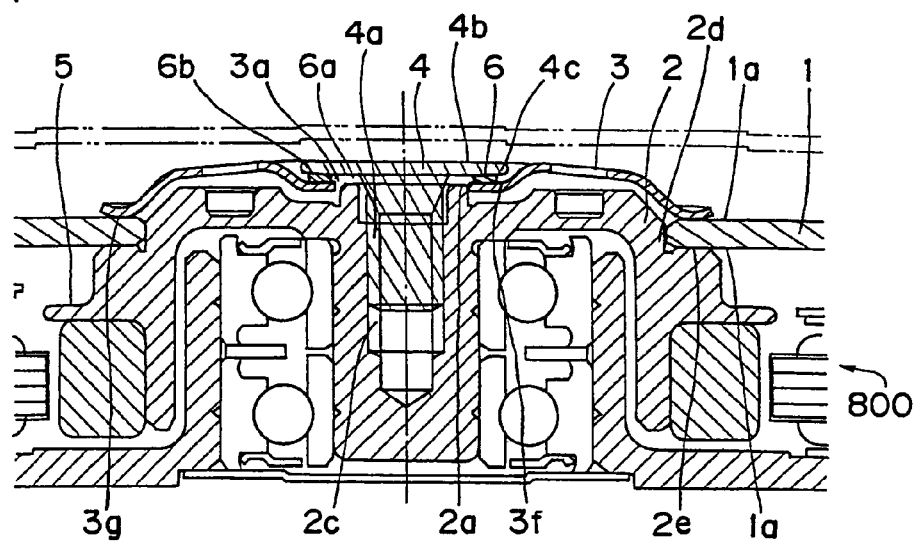
FIG. 8A is a cross-sectional view of magnetic disk apparatus according to embodiment 6 before clamped.
Figure 8B:
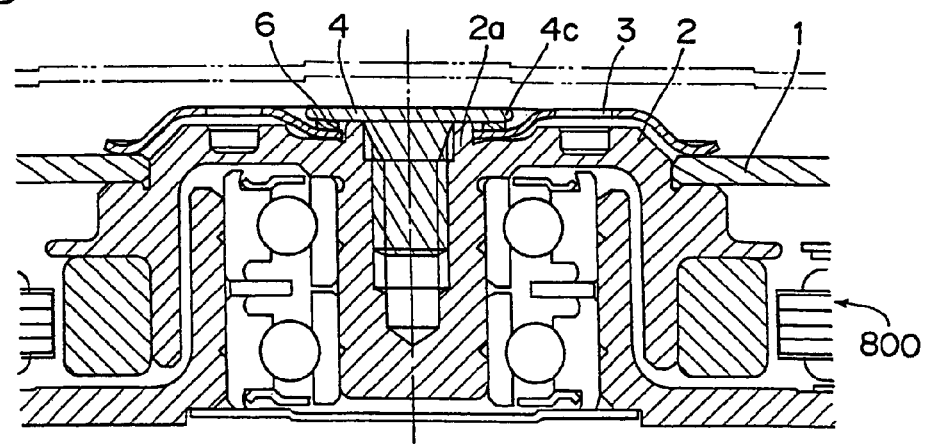
FIG. 8B is a cross-sectional view of magnetic disk apparatus according to embodiment 6 after clamped.

FIGS. 8A and 8B are cross-sectional views of clamp structure in magnetic disk apparatus 800 of embodiment 6. FIG. 8A shows a cross-sectional view of magnetic disk apparatus 800 before clamped. FIG. 8B shows a cross-sectional view of magnetic disk apparatus 800 after clamped.

Referring now to FIG. 8A, magnetic disk apparatus 800 includes disk 1 for recording information, spindle hub 2 equipped with disk 1, clamp 3 for fixing disk 1 integrally to spindle hub 2, one piece of screw 4 for tightening clamp 3 to spindle hub 2, ring-form washer 6 located between screw head section bearing surface 4c and clamp 3, and spindle motor 5 for rotating spindle hub 2. The central hole of disk 1 is inserted over disk inserting boss 2d of spindle hub 2 and one bottom surface of disk 1 is received by disk receiving surface 2e. Clamp 3 is placed on the other bottom of disk 1 coaxially with disk 1. Thread section 4a of screw 4 passes hole 6a of washer 6 and clamp central hole 3a of clamp 3, and is tightened to female screw 2c provided on boss 2a of spindle hub 2. The diameter of screw head section 4b of screw 4 is larger than the diameter of central hole 3a of clamp 3. The axial force generated when screw 4 is tightened to female screw 2c of spindle hub 2 presses the other bottom surface of disk 1 at disk depressing section 3g from screw head bearing surface 4c via one bottom surface 6b of washer 6 in contact with this and further from the other bottom surface 6b of washer 6 via the circumferential section of central hole 3a of clamp 3 in contact with this. As a result, clamp 3 fixes disk 1 to spindle hub 2 coaxially and integrally. The feature of embodiment 6 lies in the structure where washer 6 is provided between screw head section bearing surface 4c and clamp 3. By providing washer 6, clamp 3 is able to displace more by the thickness of washer 6 when fixed, and consequently, the axial force can be increased.

In order to coaxially mount disk 1 and spindle hub 2, the central hole of disk 1 and outer circumferential cylindrical section of disk insertion boss 2d of spindle hub 2 slightly smaller than the central hole diameter of disk 1 are positioned and fitted in. In addition, in order to coaxially mount clamp 3 and spindle hub 2, clamp positioning boss 2a of spindle hub 2 and clamp central hole 3a having a diameter slightly larger than the diameter of this clamp positioning boss 2a are positioned and fitted in. That is, clamp positioning boss 2a of spindle hub 2 functions as a clamp plane positioning section.

Same as the clamp structure of embodiment 1 shown in FIGS. 1A and 1B, boss 2a, disk insertion boss 2d, and disk receiving surface 2e of spindle hub 2 are all kept coaxial with the rotating center axis. On the other hand, disk depressing section 3g and clamp central hole 3a of clamp 3 are kept coaxial. That is, disk depressing section 3g is held coaxial with respect to disk receiving 2e of spindle hub 3 and disk 1.

Referring to FIG. 8B showing a cross-sectional view after clamped, screw 4 is tightened until screw head section bearing surface 4c comes in contact with clamp positioning boss 2a of spindle hub 2. The axial displacement rate of clamp 3 in such event is able to be secured as much as the thickness of washer 6, as compared to the first clamp structure (FIG. 16 and FIG. 17) in the conventional magnetic disk apparatus. Consequently, even when thinner clamp 3 is used, by securing a larger thickness of washer 6, it is possible to obtain great axial force. Furthermore, if washer 6 is coaxially joined to clamp central hole 3a, the axial force generated when screw 4 is tightened to female 2c of spindle hub 2 is uniformly transmitted in the circumferential direction to washer 6, and disk depressing section 3g of clamp 3, and increase of camber and undulation of disk 1 can be prevented.

Furthermore, if washer 6 is joined to clamp 3 in advance, it is possible to reduce the number of parts and to eliminate washer 6 positioning work at the time of assembly, and operability can be improved. In particular, washer 6 is manufactured with resin and may be integrally formed with clamp 3.

Furthermore, if the diameter of clamp central hole 3*a* is equal to or smaller than the diameter of washer hole 6*a*, in the process of tightening screw 4 and displacing clamp 3 in the axial direction, it is possible to prevent troubles concerning contact and interference between the side surface of washer hole 6 and clamp positioning boss 2*a* of spindle hub 2.

With the foregoing description, according to the invention related to the present embodiment, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 7

Figure 9A:
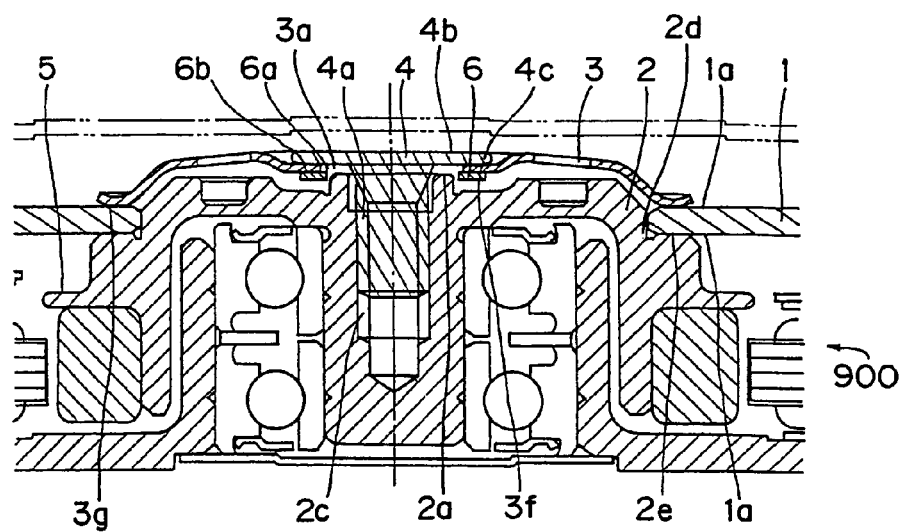
FIG. 9A is a cross-sectional view of magnetic disk apparatus according to embodiment 7 before clamped.
Figure 9B:
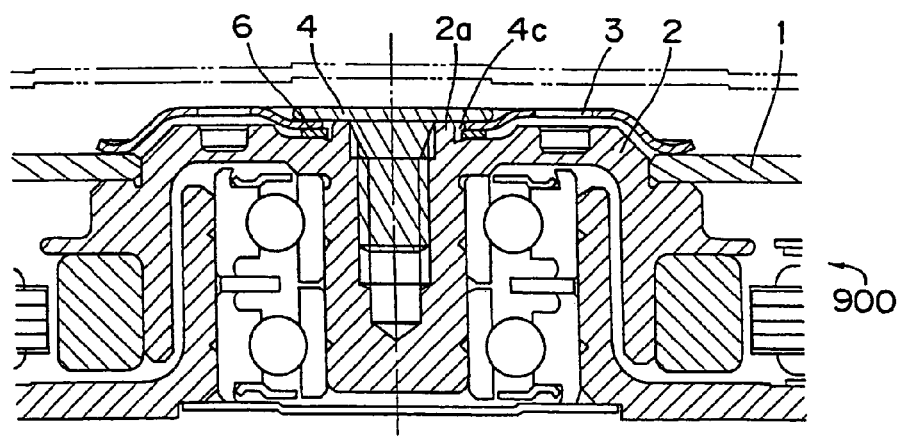
FIG. 9B is a cross-sectional view of magnetic disk apparatus according to embodiment 7 after clamped.

FIGS. 9A and 9B are cross-sectional views of clamp structure in magnetic disk apparatus 900 of embodiment 7. FIG. 9A shows a cross-sectional view of magnetic disk apparatus 900 before clamped. FIG. 9B shows a cross-sectional view of magnetic disk apparatus 900 after clamped.

Referring now to FIG. 9A, magnetic disk apparatus 900 includes disk 1 for recording information, spindle hub 2 equipped with disk 1, clamp 3 for fixing disk 1 integrally to spindle hub 2, one piece of screw 4 for tightening clamp 3 to spindle hub 2, ring-form washer 6, and spindle motor 5 for rotating spindle hub 2. The central hole of disk 1 is inserted over disk inserting boss 2*d* of spindle hub 2 and one bottom surface of disk 1 is received by receiving surface 2*e*. Clamp 3 is placed on the other bottom of disk 1 coaxially with disk 1. Screw head bearing surface 4*c* comes in contact with one bottom surface of clamp central hole 3*a*. To the other bottom of the clamp, washer 6 is joined. Thread section 4*a* of screw 4 passes hole 6*a* of washer 6 and clamp central hole 3*a* of clamp 3, and is tightened to female screw 2*c* provided on boss 2*a* of spindle hub 2. The diameter of screw head section 4*b* of screw 4 is larger than the diameter of central hole 3*a* of clamp 3. The axial force generated when screw 4 is tightened to female screw 2*c* of spindle hub 2 presses the other bottom surface of disk 1 at disk depressing section 3*g* from screw head bearing surface 4*c* via the circumferential section of central hole 3*a* of clamp 3 in contact with this. As a result, clamp 3 fixes disk 1 to spindle hub 2 coaxially and integrally.

In order to coaxially mount disk 1 and spindle hub 2, the central hole of disk 1 and outer circumferential cylindrical section of disk insertion boss 2*d* of spindle hub 2 slightly smaller than the central hole diameter of disk 1 are positioned and fitted in. In addition, in order to coaxially mount clamp 3 and spindle hub 2, clamp positioning boss 2*a* of spindle hub 2 and washer hole 6*a* having a diameter slightly larger than the diameter of this clamp positioning boss 2*a* are positioned and fitted in. That is, clamp positioning boss 2*a* of spindle hub 2 functions as a clamp plane positioning section.

Same as the clamp structure of embodiment 1 shown in FIGS. 1A and 1B, boss 2*a*, disk insertion boss 2*d*, and disk receiving surface 2*e* of spindle hub 2 are all kept coaxial with the rotating center axis. On the other hand, disk depressing section 3*g* and clamp central hole 3*a* of clamp 3 are kept coaxial. Furthermore, washer 6*a* is coaxially joined to clamp central hole 3*a*. That is, disk depressing section 3*g* is held coaxial with respect to disk receiving surface 2*e* of spindle hub 3 and disk 1.

Referring to FIG. 9B showing a cross-sectional view after clamped, screw 4 is tightened until screw head section bearing surface 4*c* comes in contact with clamp positioning boss 2*a* of spindle hub 2. The axial displacement rate of clamp 3 in such event is able to be secured as much as the thickness of washer 6, as compared to the first clamp structure (FIG. 16 and FIG. 17) in the conventional magnetic disk apparatus. Consequently, even when thinner clamp 3 is used, by securing a larger thickness of washer 6, it is possible to obtain great axial force.

Furthermore, if washer 6 is joined to clamp 3 in advance, it is possible to reduce the number of parts and to eliminate washer 6 positioning work at the time of assembly, and operability can be improved. In particular, washer 6 is manufactured with resin and may be integrally formed with clamp 3.

Furthermore, if the diameter of clamp central hole 3*a* is equal to or larger than the diameter of washer hole 6*a*, in the process of tightening screw 4 and displacing clamp 3 in the axial direction, it is possible to prevent troubles concerning contact and interference between the side surface of washer hole 3*a* and clamp positioning boss 2*a* of spindle hub 2.

With the foregoing description, according to the invention related to the present embodiment, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 8

Figure 10:
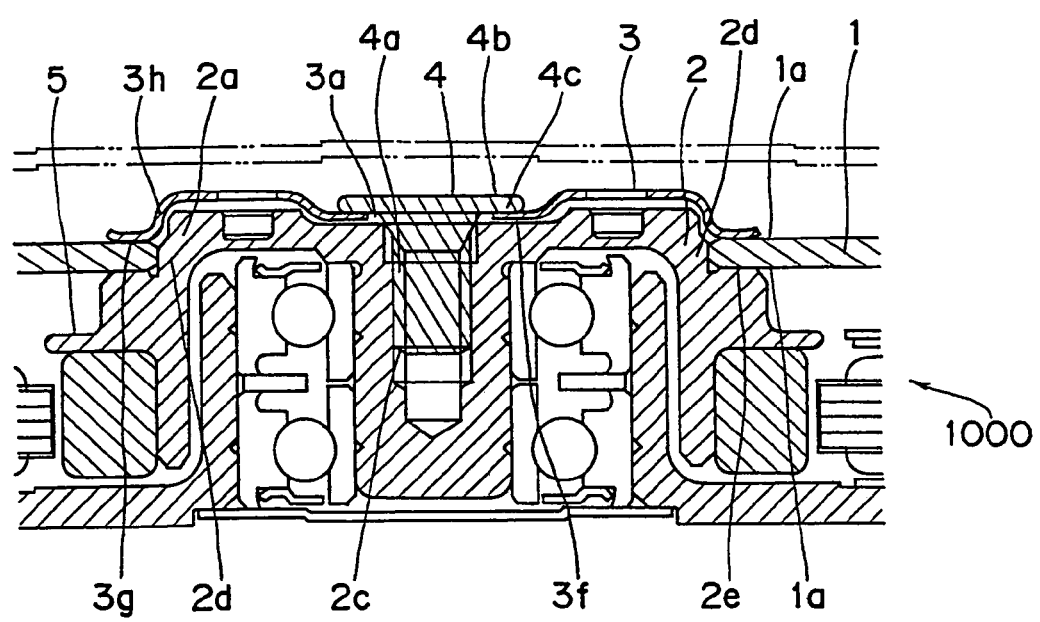
FIG. 10 is a cross-sectional view of a clamp structure in magnetic disk apparatus according to embodiment 8.

FIG. 10 is a cross-sectional view of a clamp structure in magnetic disk apparatus 1000 of embodiment 8.

Referring to FIG. 10, magnetic disk apparatus 1000 includes disk 1 for recording information, spindle hub 2 equipped with disk 1, clamp 3 for fixing disk 1 integrally to spindle hub 2, one piece of screw 4 for tightening clamp 3 to spindle hub 2, and spindle motor 5 for rotating spindle hub 2. The central hole of disk 1 is inserted over disk inserting boss 2*d* of spindle hub 2 and one bottom surface of disk 1 is received by disk receiving surface 2*e*. Clamp 3 is placed on the other bottom of disk 1 coaxially with disk 1, and screw 4 is tightened to female screw 2*c* provided on boss 2*a* of spindle hub 2 via the clamp central hole 3*a*. The diameter of screw head section 4*b* of screw 4 is larger than the diameter of central hole 3*a* of clamp 3. The axial force generated when screw 4 is tightened to female screw 2*c* of spindle hub 2 the other bottom surface of disk 1 at disk depressing section 3*g* from screw head bearing surface 4*c* via the circumferential section of central hole 3*a* of clamp 3 in contact with this. As a result, clamp 3 fixes disk 1 to spindle hub 2 coaxially and integrally.

In order to coaxially mount disk 1 and spindle hub 2, the central hole of disk 1 and outer circumferential cylindrical section of disk insertion boss 2*d* of spindle hub 2 slightly smaller than the central hole diameter of disk 1 are positioned and fitted in. In order to coaxially mount clamp 3 and spindle hub 2, deep-drawn cylindrical section 3*h* mounted to clamp 3, with diameter smaller than the diameter of disk depressing section 3*g* and larger than clamp central hole 3*a* and a boss with diameter larger than this and equal to or smaller than disk insertion boss 2*d* of spindle hub 2 are positioned and fitted in.

Same as the clamp structure of embodiment 1 shown in FIGS. 1A and 1B, boss 2*a*, disk insertion boss 2*d*, and disk receiving surface 2*e* of spindle hub 2 are all kept coaxial with the rotating center axis. On the other hand, disk depressing section 3*g* and deep-drawn cylindrical section 3*h* of clamp 3 are kept coaxial. That is, disk depressing section 3*g* is held coaxial with respect to disk receiving surface 2*e* of spindle hub 3 and disk 1.

According to this clamp structure, as compared to the first clamp structure (FIG. 16 and FIG. 17) in the conventional magnetic disk apparatus, the axial displacement rate of clamp 3 is able to be secured without being subject to thickness of clamp 3, axial displacement of clamp 3, and restrictions between clamp central hole 3*a* and positioning fit allowance of clamp positioning boss 2*a* of spindle hub 2. Consequently, even when thinner clamp 3 is used, it is possible to obtain great axial force.

With the foregoing description, according to the invention related to the present embodiment, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 9

Figure 11A:
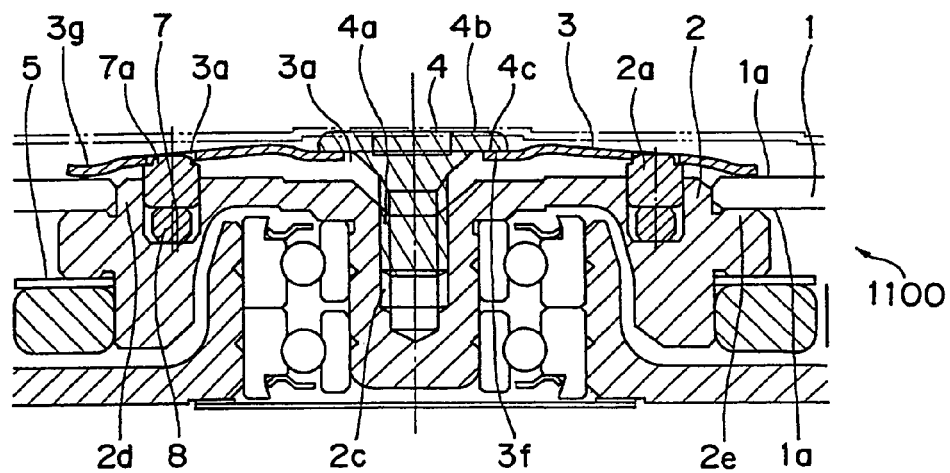
FIG. 11A is a cross-sectional view of magnetic disk apparatus according to embodiment 9 before clamped.
Figure 11B:
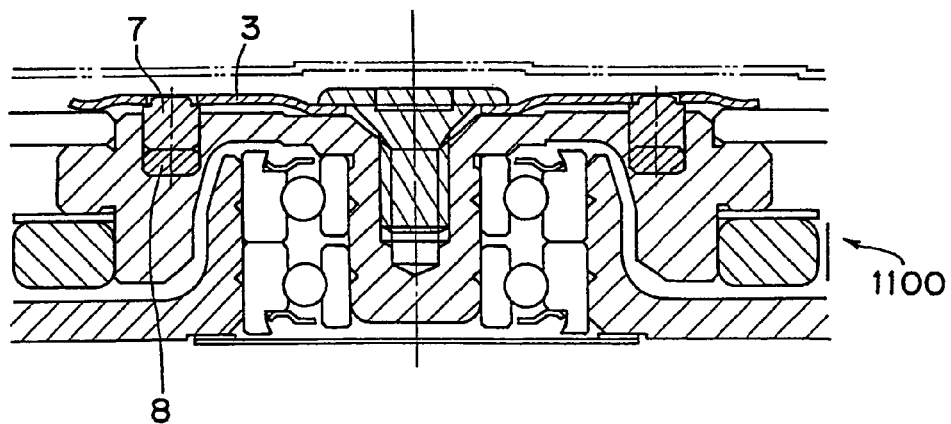
FIG. 11B is a cross-sectional view of magnetic disk apparatus according to embodiment 9 after clamped.

FIGS. 11A and 11B are cross-sectional views of clamp structure in magnetic disk apparatus 1100 of embodiment 9. FIG. 11A shows a cross-sectional view of magnetic disk apparatus 1100 before clamped. FIG. 11B shows a cross-sectional view of magnetic disk apparatus 1100 after clamped.

Referring now to FIG. 11A, magnetic disk apparatus 1100 includes disk 1 for recording information, spindle hub 2 equipped with disk 1, clamp 3 for fixing disk 1 integrally to spindle hub 2, one piece of screw 4 for tightening clamp 3 to spindle hub 2, and spindle motor 5 for rotating spindle hub 2. The central hole of disk 1 is inserted over disk inserting boss 2*d* of spindle hub 2 and one bottom surface of disk 1 is received by disk receiving surface 2*e*. Clamp 3 is placed on the other bottom of disk 1 coaxially with disk 1, and screw 4 is tightened to female screw 2*c* provided on boss 2*a* of spindle hub 2 via the clamp central hole 3*a*. The diameter of screw head section 4*b* of screw 4 is larger than the diameter of central hole 3*a* of clamp 3. The axial force generated when screw 4 is tightened to female screw 2*c* of spindle hub 2 is transmitted from screw head section bearing surface 4*c* to bottom surface 3*f* in the vicinity of clamp central hole 3*a*, and presses the other bottom surface of disk 1 at disk depressing section 3*g*. As a result, clamp 3 fixes disk 1 to spindle hub 2 coaxially and integrally.

Figure 19A:
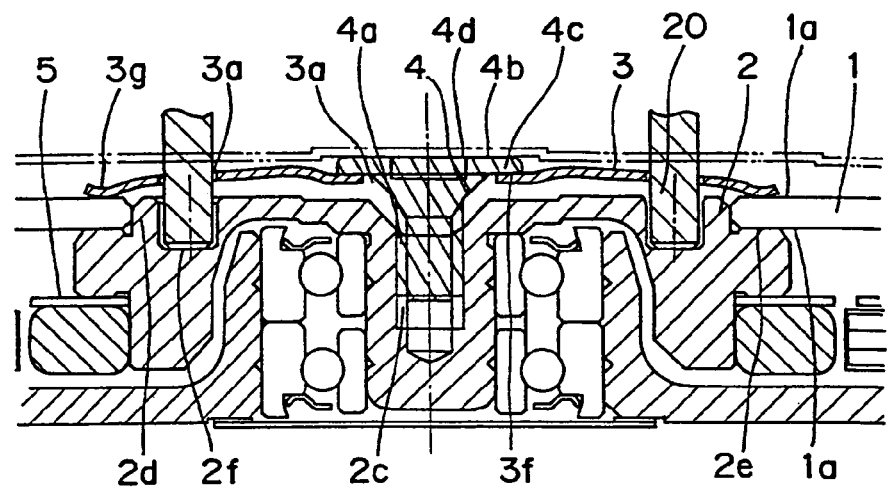
FIG. 19A is a cross sectional view before clamped showing the second clamp structure in conventional magnetic disk apparatus.
Figure 19B:
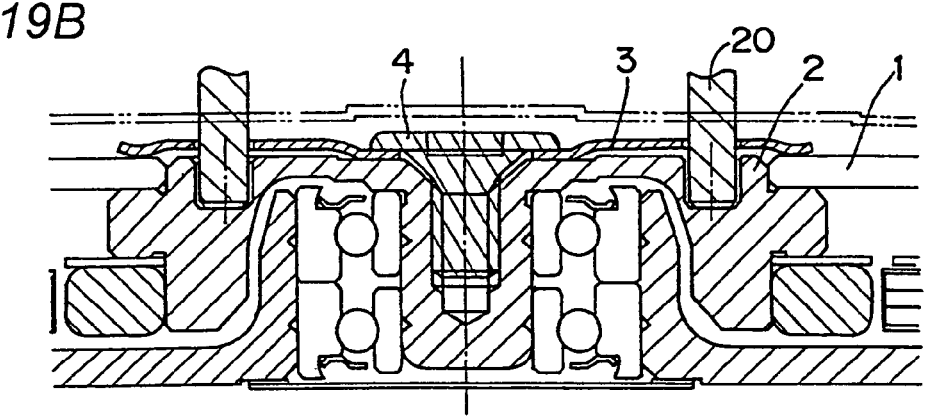
FIG. 19B is a cross sectional view after clamped showing the second clamp structure in conventional magnetic disk apparatus.
Figure 20:
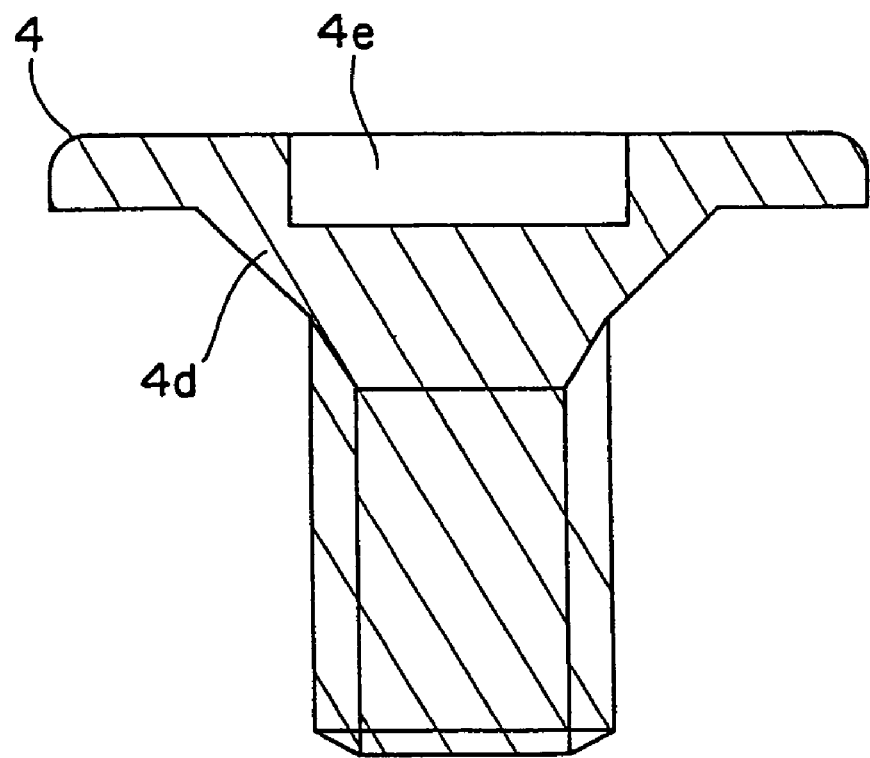
FIG. 20 is a cross-sectional view of thread with reinforced screw driving hole and reinforced screw head section.

In order to coaxially mount disk 1 and spindle hub 2, the central hole of disk 1 and outer circumferential cylindrical section of disk insertion boss 2*d* of spindle hub 2 slightly smaller than the central hole diameter of disk 1 are positioned and fitted in. So far, the description is the same as that for the second clamp structure in the conventional magnetic disk apparatus (FIGS. 19A and 19B).

The feature of embodiment 9 lies in the structure in which clamp 3 is coaxially equipped to spindle hub 2. Now, the detail is explained as follows. Spindle hub 2 has two or more clamp positioning bosses 2*a* at equiangular intervals on the pitch circle coaxial with the rotating center axis. On the other hand, on clamp 3, two or more holes 3*o* are provided at same angle intervals or at angle intervals of positions equal to the integer number on the pitch circle same as the arrangement of clamp positioning boss 2*a* of spindle hub 2. The head-end diameter of clamp positioning boss 2*a* is smaller than hole 3*o* of clamp 3 and clamp positioning boss 2*a* is inserted into hole 3*o* of clamp 3 and clamp 3 is coaxially mounted to spindle hub 2. In FIGS. 11A and 11B, pin 7 is inserted particularly in place of boss 2*a*. Pin 7 is only able to position clamp 3 and may provide high rigidity like metal or may be resin, etc. Furthermore, at the head-end section in contact with clamp 3 of pin 7, step 7*a* is provided, and the diameter of this step 7*a* is smaller than the diameter of hole 3*o* of clamp 3. In addition, axial length of step 7*a* is formed at the level equivalent to or less than the thickness of clamp 3. Furthermore, at the other end of pin 7, elastic material 8 is provided.

Note that, same as the second clamp structure (FIGS. 19A and 19B) in the conventional magnetic disk apparatus, both spindle hub 2 disk insertion boss 2*d* and disk receiving surface 2*e* hold coaxiality to the rotating center axis. On the other hand, disk depressing section 3*g* and clamp central hole 3*a* of clamp 3 are kept coaxial. That is, disk depressing section 3*g* is held coaxial with disk receiving surface 2*e* of spindle hub 3 and disk 1.

Referring now to FIG. 11B which shows a cross-sectional view after clamped, pin 7 compresses elastic material 8 as clamp 3 is displaced in the axial direction and pin 7 is displaced in the axial displacement direction of clamp 3. That is, if elastic material 8 is unable to prevent displacement of clamp 3 in the axial force direction, rubber with low rigidity or a metal spring may be used.

According to this structure, trouble in that jig pin 20 is unable to be removed, which is a problem of the second clamp structure (FIGS. 19A and 19B) in the conventional magnetic disk apparatus, can be solved. In addition, operations of inserting and positioning the jig pin can be eliminated, and assembly can be simplified. Furthermore, since the height of positioning pin 7 to obtain coaxiality with clamp 3 and disk receiving surface 2*e* of spindle hub 2 does not become higher than clamp 3, adverse effects for reducing thickness of positioning pin 7 can be dissolved. Consequently, it is possible to obtain large axial force by taking greater displacement rate to the above-mentioned screw axial force direction even if thin clamp 3 is used. With the foregoing description, conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk can be simultaneously satisfied.

EMBODIMENT 10

Figure 12:
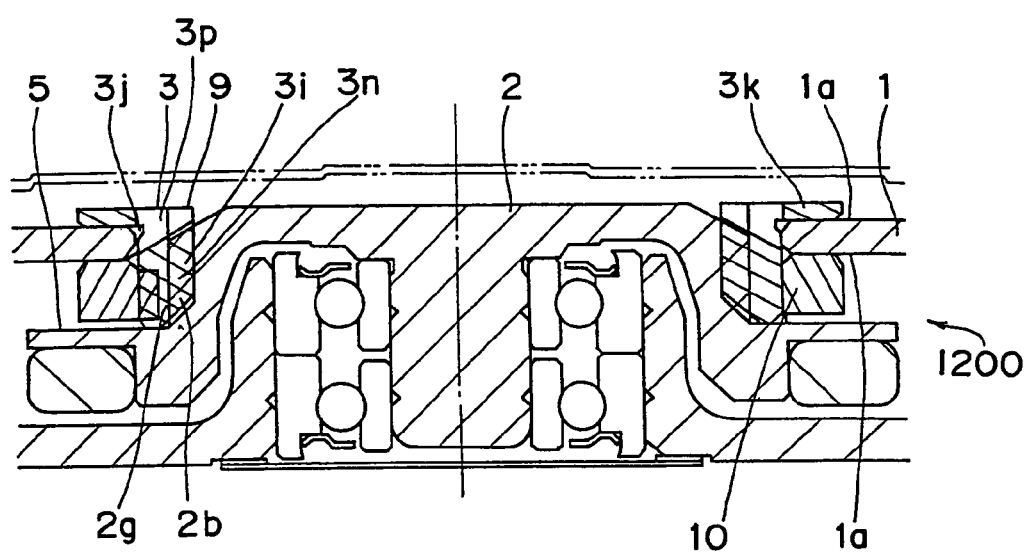
FIG. 12 is a cross-sectional view of a clamp structure in magnetic disk apparatus according to embodiment 10.

FIG. 12 is a cross-sectional view of a clamp structure in magnetic disk apparatus 1200 of embodiment 10.

Referring now to FIG. 12, magnetic disc apparatus 1200 includes disk 1 for recording information, clamp disk assembly 9 with disk 1 integrally mounted, spindle hub 2 with clamp disk assembly 9 integrally mounted, and spindle motor 5 for rotating the spindle hub.

Figure 13:
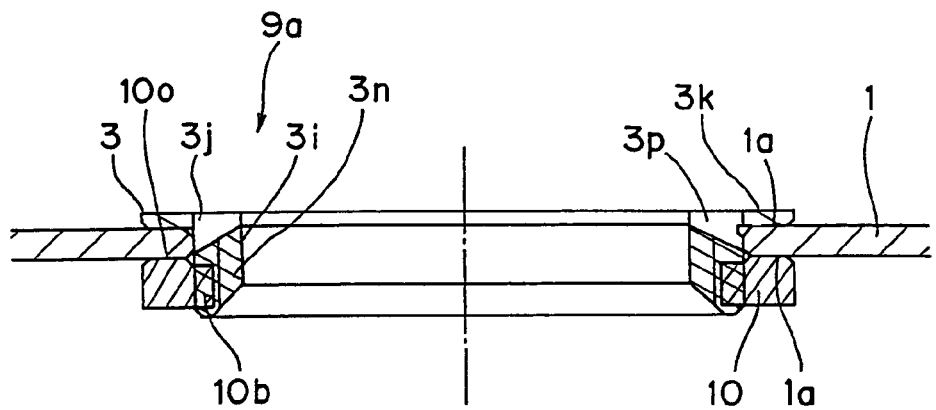
FIG. 13 is a cross-sectional view of the first clamp disk assembly related to embodiment 10.

First of all, description will be made on the clamp disk assembly. FIG. 13 is a cross-sectional view of the first clamp disk assembly 9a related to embodiment 10. Clamp disk assembly 9a includes clamp 3 and shim 10, and disk 1. Clamp 3 has flange section 3k larger than central hole diameter of inner circumferential cylindrical section 3i and disk 1, and shim 10 is of nearly ring form with a central hole and outer circumference smaller than the outer circumferential section of disk 1. Clamp disk assembly 9a is assembled by inserting central holes of disk 1 and shim 10 into outer circumferential cylindrical section 3j of clamp 3, and both bottom surfaces 1a of disk 1 are grasped between flange section 3k of clamp disk assembly 9a and bottom surface 10a of shim 10 to integrally fix.

Figure 14:
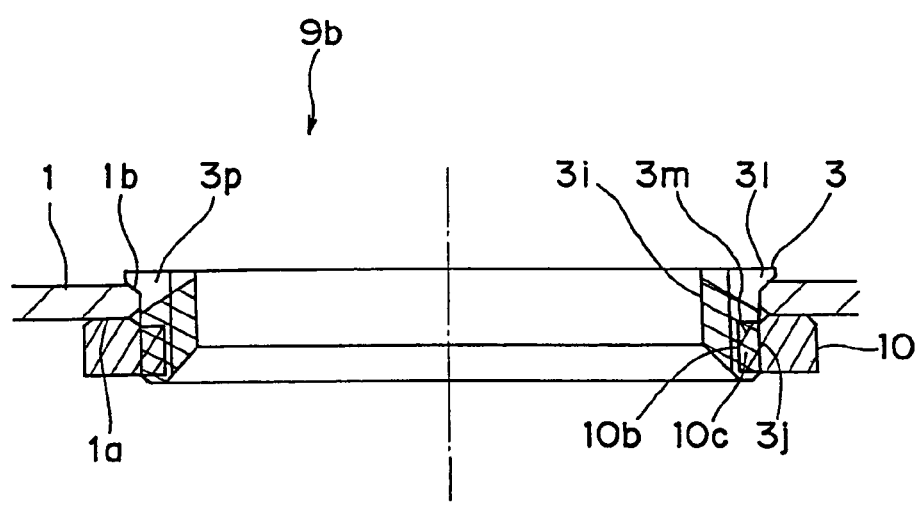
FIG. 14 is a cross-sectional view of the second clamp disk assembly related to embodiment 10.

FIG. 14 is a cross-sectional view of the second clamp disk assembly 9b related to embodiment 10. Clamp disk assembly 9b includes clamp 3, and shim 10, and disk 1. Clamp 3 has disk-like flange section 31 larger than the central hole diameter of inner circumferential cylindrical section 3i and disk 1, and shim 10 is of nearly ring form with the central hole and the outer circumference smaller than the outer circumferential section of disk 1. Clamp disk assembly 9b is assembled through processes of inserting central holes of disk 1 and shim 10 into outer circumferential cylindrical section 3j of clamp 3, grasping the other bottom surface 1a of disk 1 between the chamfered section 1b on the inner circumference of one bottom surface and bottom surface 10a of shim 10, and are integrally fixed.

For a method to fix shim 10 to clamp 3, there is a method to pressure-fit clamp outer circumferential cylindrical section 3j side surface and shim inner circumferential side surface 10b. Or, there is shrinkage-fit of clamp outer circumferential cylindrical section 3j side surface and shim inner circumferential side surface 10b. Or, shim 10 may be fixed by tightening male screw 3m located on the clamp outer circumferential cylindrical section 3j side surface to female screw 10c located to shim inner circumferential side surface 10b. FIG. 12 through FIG. 14 show fixing achieved by the third method. Furthermore, in such event, it is convenient to provide two or more slits 3p in bottom surface of shim 10, or bottom surface 3f of clamp 3 (in particular, flange section 3k) to transmit torque and hold parts. FIG. 12 through FIG. 14 show the case in which slit 3p is provided on flange section 3k.

Referring now to FIG. 12, description will be made on mounting of clamp disk assembly 9 to spindle hub 2. Outer circumferential cylindrical section 2g of spindle hub 2 is inserted and fixed to inner circumferential cylindrical section 3i of clamp 3. For a specific fixing method of inner circumferential cylindrical section 3i of clamp 3 to outside cylindrical section 2g of spindle hub 2, there is pressure-fit. Or there is shrinkage-fit of inner circumferential cylindrical section 3i to outer circumferential cylindrical section 2g of spindle hub. Or, there is a method of tightening female screw 3n provided at inner circumferential cylindrical section 3i of clamp 3 and male screw 2b provided at male screw provided on the outer circumferential cylindrical section 2g of spindle hub 2. In FIG. 12 through FIG. 14, fixing by the third method is shown. Furthermore, in this event, providing two or more slits 3p in flange section 3k can enable convenient torque transmission and parts holding. FIG. 12 through FIG. 14 show the case in which two or more slits 3p are provided on flange section 3k.

The use of the fixing method of disk 1 of spindle hub using these previously described methods can satisfy conflicting requirements of reduced thickness of magnetic disk apparatus by reducing thickness of a clamp, improved shock resistance by increase of clamping force, and reduced rotating synchronous deviation such as camber, undulation, etc. of the disk generated by eccentricity between disk depressing section, disk receiving surface of the spindle hub, and the disk without being subject to restrictions by the problems shown in the first clamp structure and the second clamp structure in conventional magnetic disk apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disk apparatus comprising:
   a disk which stores information;
   a clamp which has a central hole;
   a spindle hub which is equipped with the disk, has a boss that fits into the clamp and allows a rotating center axis of the spindle hub to coincide with a center axis of the clamp;
   a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and
   a spindle motor which rotates the spindle hub,
   wherein the clamp is displaced in a direction of the axial force at a first portion thereof positioned radially inwardly of a contact region where the clamp and the head section are held in contact with each other.

2. The disk apparatus according to claim 1, wherein the clamp is further displaced in a direction opposite to the direction of the axial force at a second portion thereof positioned radially inwardly of the first portion.

3. A disk apparatus comprising:
   a disk which stores information;
   a clamp which has a central hole;
   a spindle hub which is equipped with the disk, has a boss that fits into the clamp and allows a rotating center shaft of the spindle hub to coincide with a center shaft of the clamp;
   a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and
   a spindle motor which rotates the spindle hub,
   wherein the clamp on a circumference more radially inward than a contact section between the clamp and the head section, and has a plurality of protrusions in a direction of the axial force.

4. The disk apparatus according to claim 3, wherein the spindle hub fits in an inner circumferential side surface of the plurality of protrusions of the clamp and allows a rotating center axis of the spindle hub to coincide with a center axis of the clamp.

5. A disk apparatus comprising:
   a disk which stores information;
   a clamp which has a central hole;

a spindle hub which is equipped with the disk, has a boss that fits into the clamp and allows a rotating center axis of the spindle hub to coincide with a center axis of the clamp;

a screw which has a thread section and a head section, said thread section passing the central hole of the clamp and being tightened to the spindle hub, and said head section coming in contact with the clamp and providing the clamp with an axial force generated when the thread section is tightened to the spindle hub, to fix the disk to the spindle hub; and a spindle motor which rotates the spindle hub, wherein the clamp on a circumference more radially inward than a contact section between the clamp and the head section, has a plurality of protrusions in a direction opposite to a direction of the axial force.

6. The disk apparatus according to claim 5, wherein the spindle hub is equipped with a boss which fits in an inner circumferential side surface where no plurality of protrusions of clamp exist and allows the rotating center axis of the spindle hub to coincide with the center axis of the clamp.

* * * * *